US009459789B2

(12) United States Patent
Yamamoto

(10) Patent No.: US 9,459,789 B2
(45) Date of Patent: Oct. 4, 2016

(54) INFORMATION PROCESSING APPARATUS AND OPERATION METHOD THEREOF FOR DETERMINING A FLICK OPERATION OF A POINTER

(75) Inventor: Keiichi Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 949 days.

(21) Appl. No.: 13/284,682

(22) Filed: Oct. 28, 2011

(65) Prior Publication Data

US 2012/0131517 A1    May 24, 2012

(30) Foreign Application Priority Data

Nov. 24, 2010 (JP) ................................. 2010-261607
Jul. 27, 2011 (JP) ................................. 2011-164009

(51) Int. Cl.
G06F 3/0488    (2013.01)
G06F 3/041    (2006.01)

(52) U.S. Cl.
CPC ......... *G06F 3/04883* (2013.01); *G06F 3/0416* (2013.01)

(58) Field of Classification Search
CPC ... G06F 3/04883; G06F 3/017; G06F 3/0488
USPC ....................................................... 715/863
See application file for complete search history.

(56) References Cited

U.S. PATENT DOCUMENTS

| | | | |
|---|---|---|---|
| 7,614,019 B2* | 11/2009 | Rimas Ribikauskas et al. ............................ | 715/863 |
| 7,627,834 B2* | 12/2009 | Rimas-Ribikauskas et al. ............................ | 715/863 |
| 7,761,814 B2* | 7/2010 | Rimas-Ribikauskas et al. ............................ | 715/863 |
| 2002/0015064 A1* | 2/2002 | Robotham et al. ........... | 345/863 |
| 2006/0055662 A1* | 3/2006 | Rimas-Ribikauskas et al. ............................ | 345/156 |
| 2006/0055684 A1* | 3/2006 | Rimas-Ribikauskas et al. ............................ | 345/179 |
| 2006/0210958 A1* | 9/2006 | Rimas-Ribikauskas et al. ............................ | 434/362 |
| 2006/0256118 A1* | 11/2006 | Kake et al. ................... | 345/473 |
| 2007/0064004 A1* | 3/2007 | Bonner et al. ................ | 345/442 |
| 2008/0205714 A1* | 8/2008 | Benkley et al. .............. | 382/126 |
| 2009/0128374 A1* | 5/2009 | Reynolds et al. .............. | 341/33 |
| 2009/0273571 A1 | 11/2009 | Bowens | |
| 2009/0307631 A1 | 12/2009 | Kim | |
| 2010/0079411 A1* | 4/2010 | Lee et al. ....................... | 345/175 |
| 2010/0125786 A1* | 5/2010 | Ozawa et al. ................ | 715/702 |
| 2010/0146412 A1* | 6/2010 | Nagase .......................... | 715/760 |
| 2010/0251116 A1* | 9/2010 | Rimas-Ribikauskas et al. ............................ | 715/702 |

FOREIGN PATENT DOCUMENTS

| | | |
|---|---|---|
| CN | 101727286 A | 6/2010 |
| JP | 2005-149531 A | 6/2005 |
| JP | 2006-085703 A | 3/2006 |
| JP | 2010-109788 A | 5/2010 |
| JP | 2010-176332 A | 8/2010 |
| KR | 10-0900295 B1 | 5/2009 |

\* cited by examiner

*Primary Examiner* — Sara England
(74) *Attorney, Agent, or Firm* — Canon USA, Inc. IP Division

(57) ABSTRACT

There is provided an information processing apparatus with an interface with high convenience for a user. A reference speed is set according to an amount of movement or a movement time period of a pointer of a stylus or a finger. It is determined based on a movement speed of the pointer and the reference speed that a flick operation with the pointer has occurred.

12 Claims, 18 Drawing Sheets

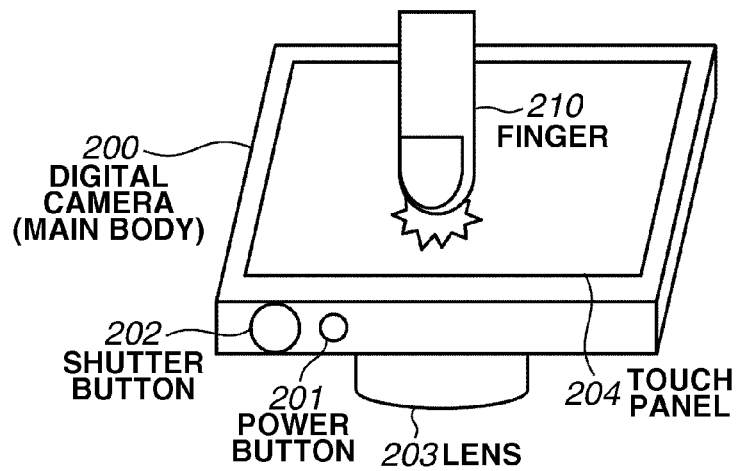
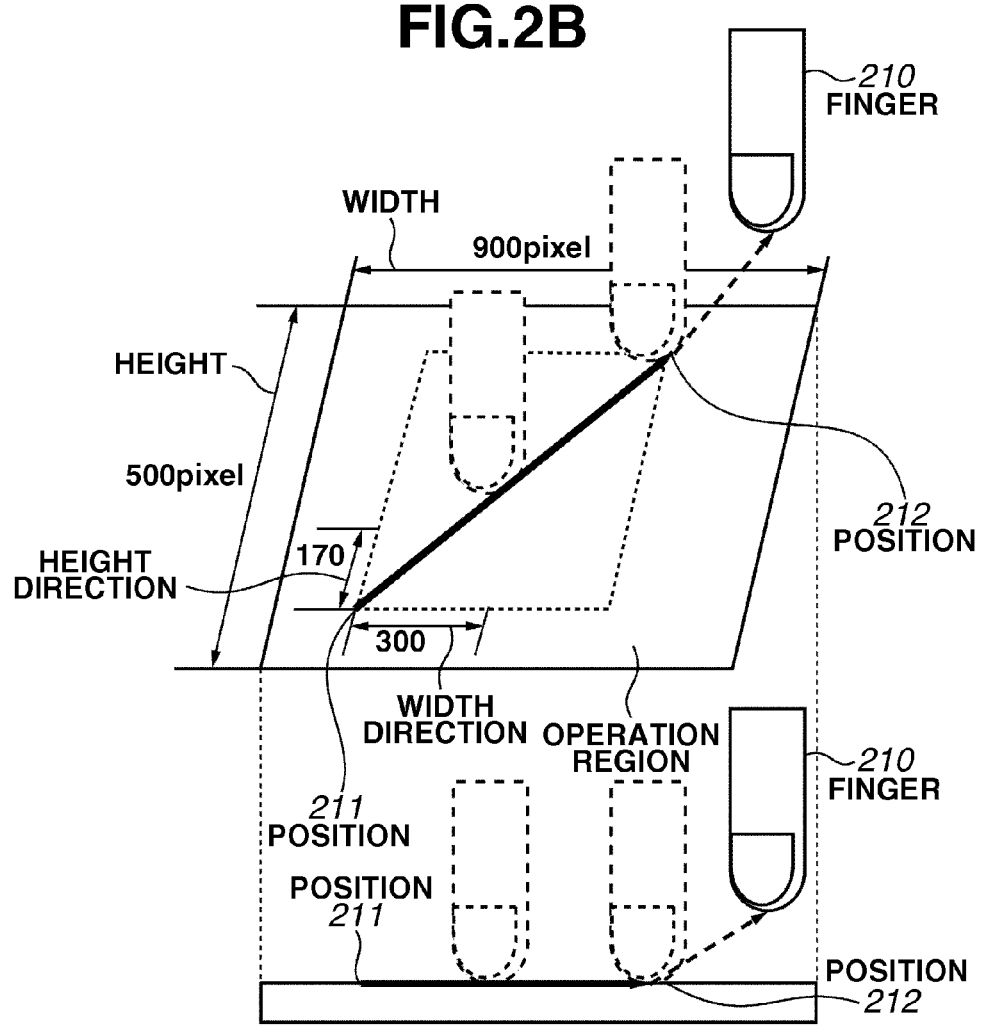

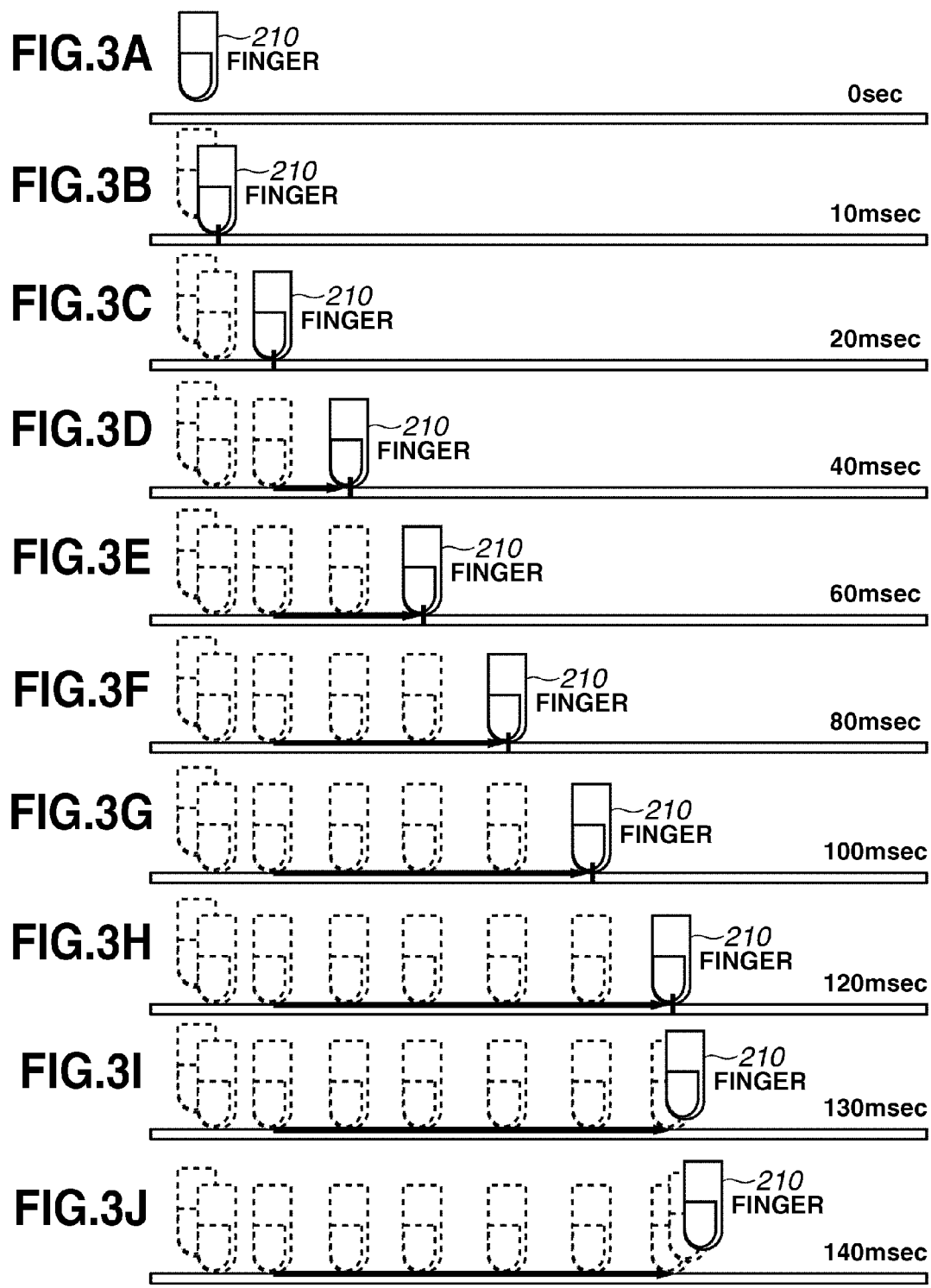

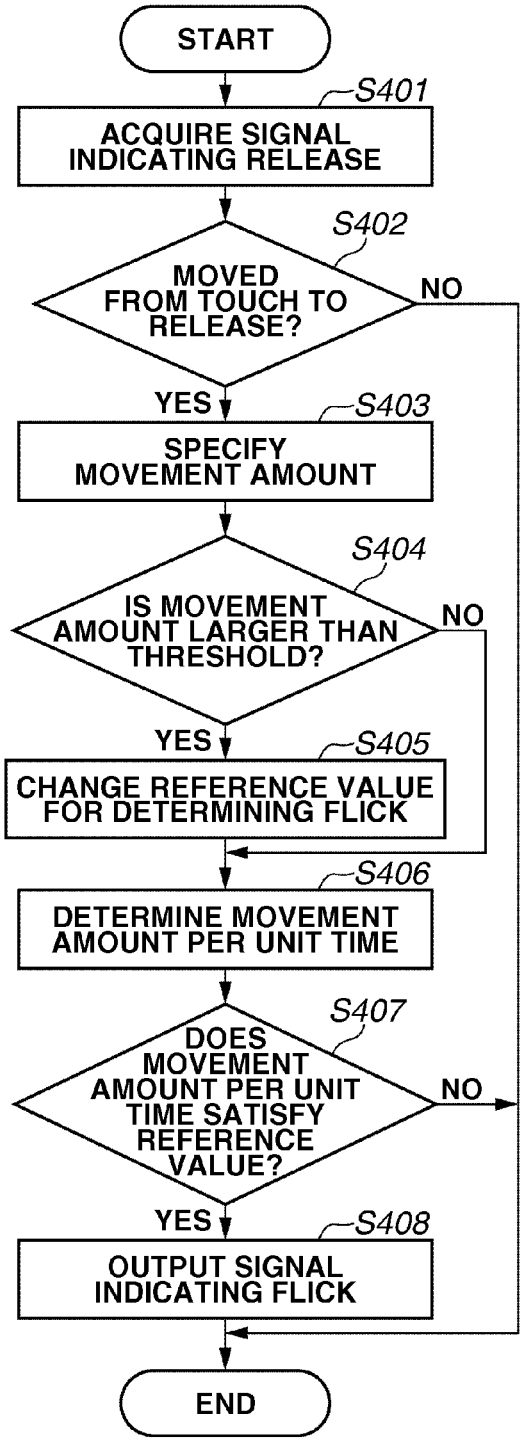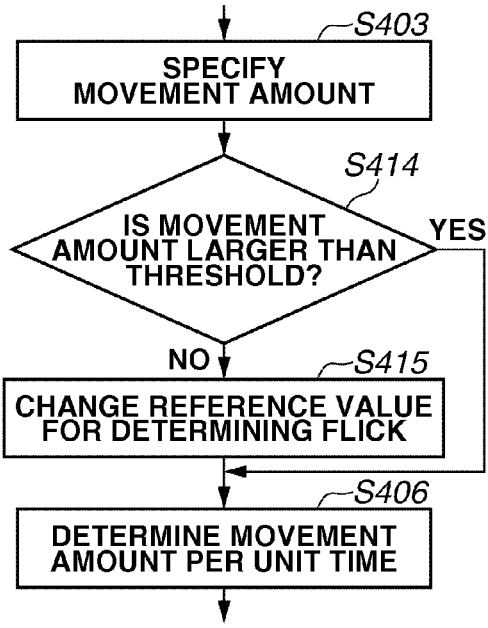

FIG.5A
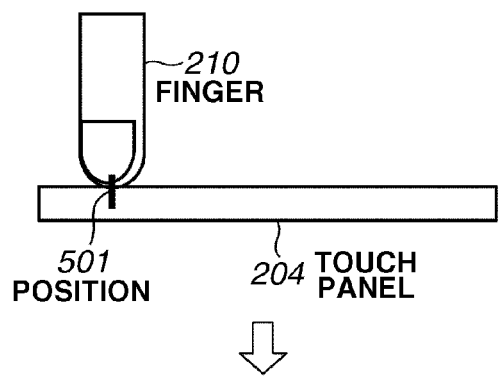
FIG.5B
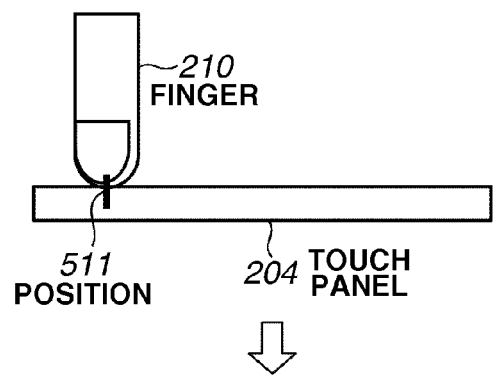
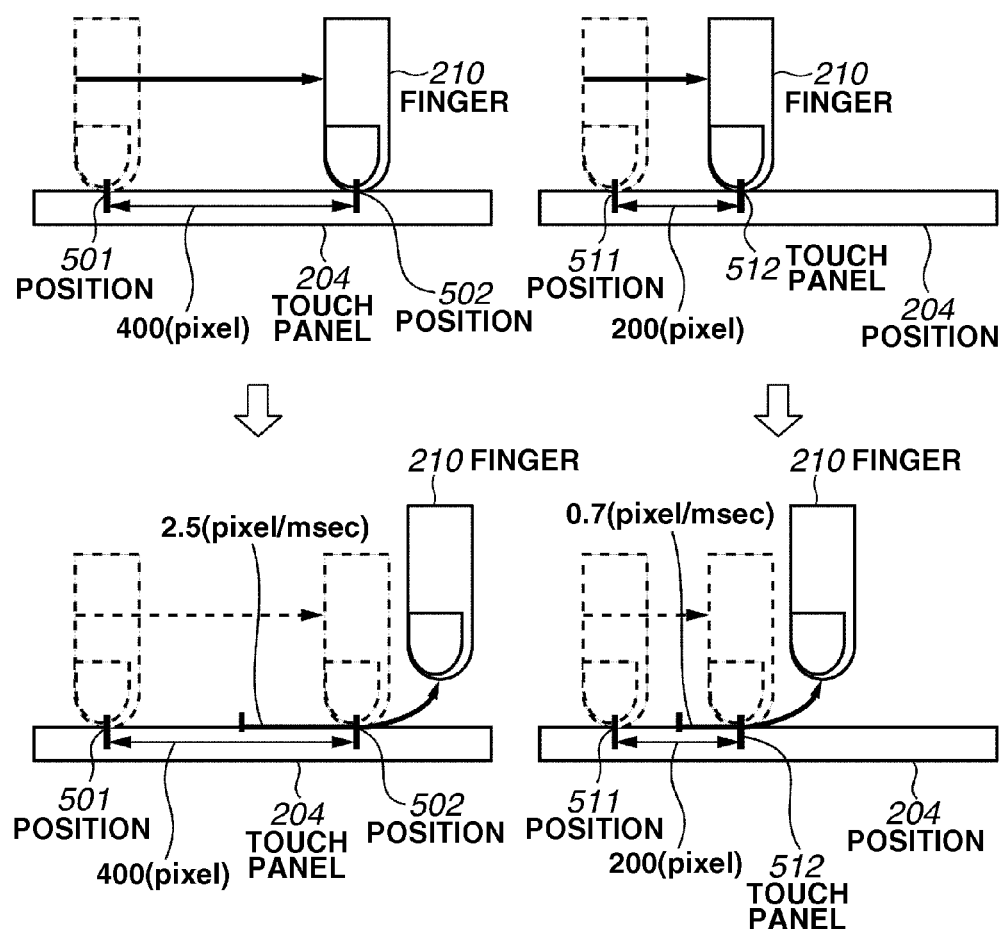

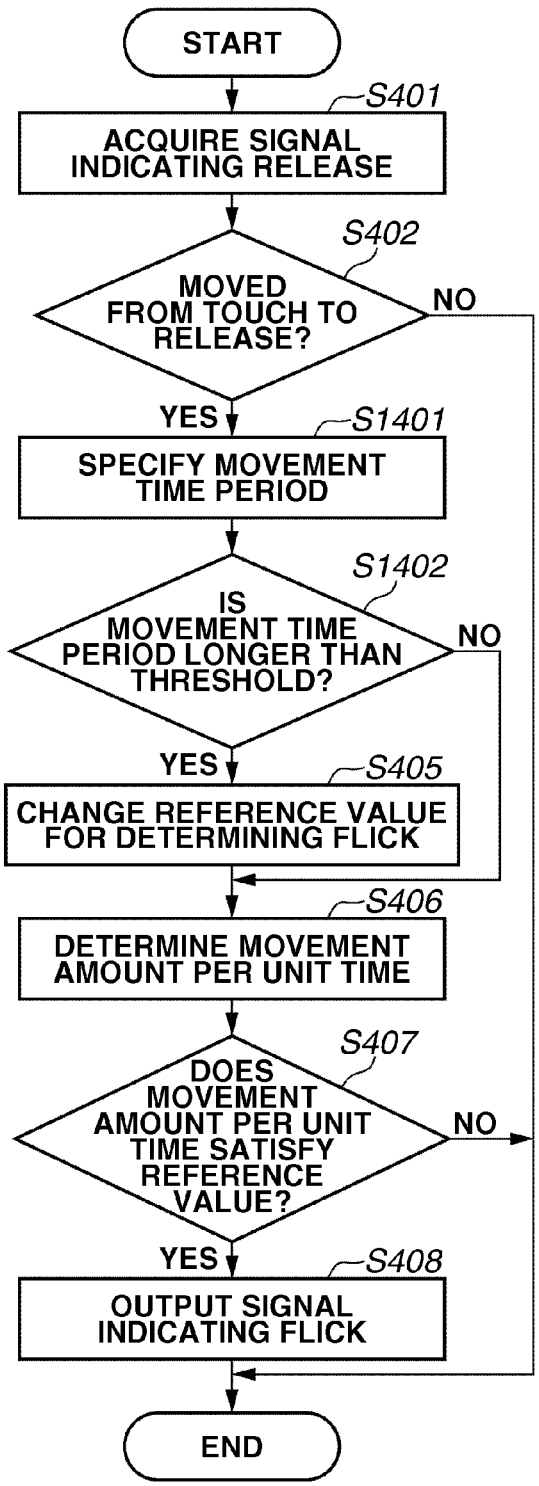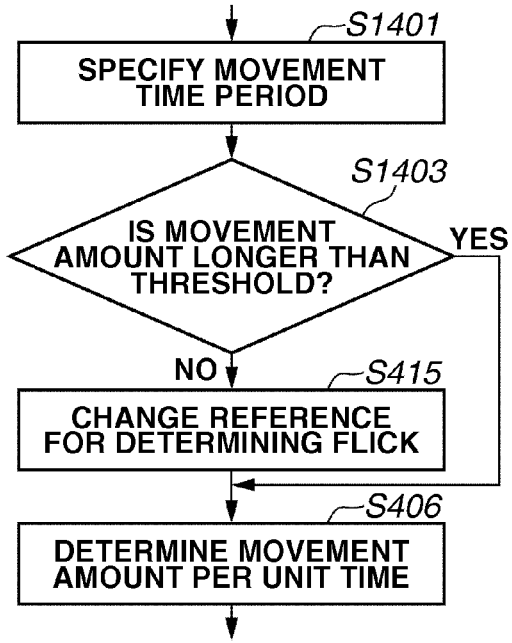

FIG.15A    FIG.15B
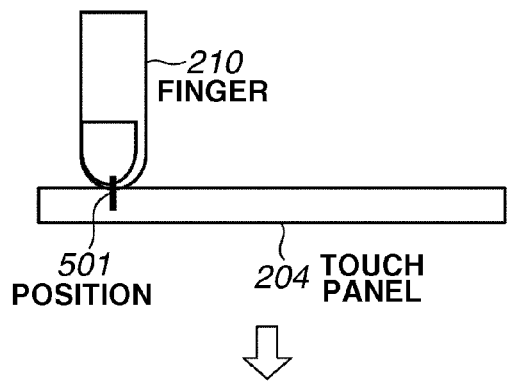
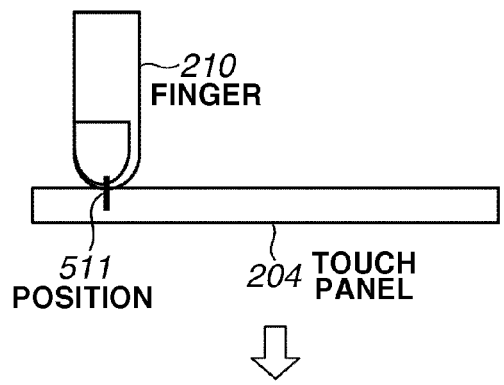
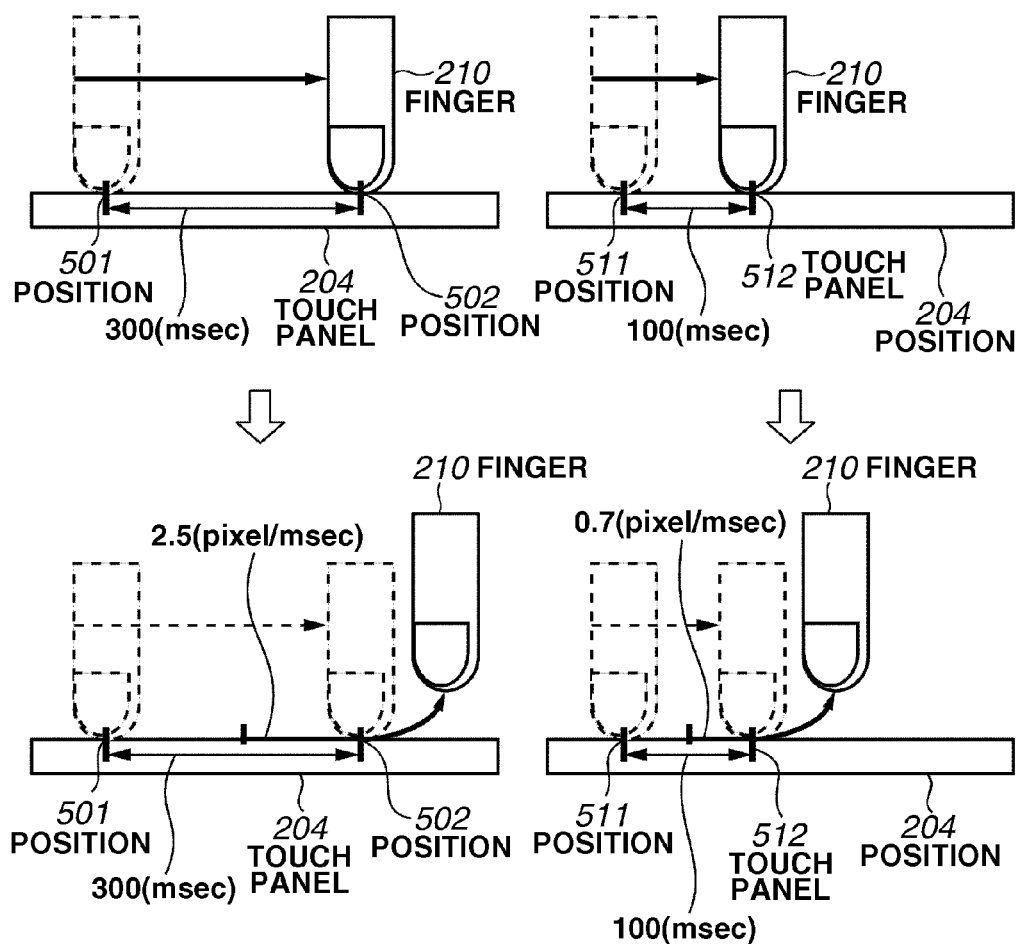

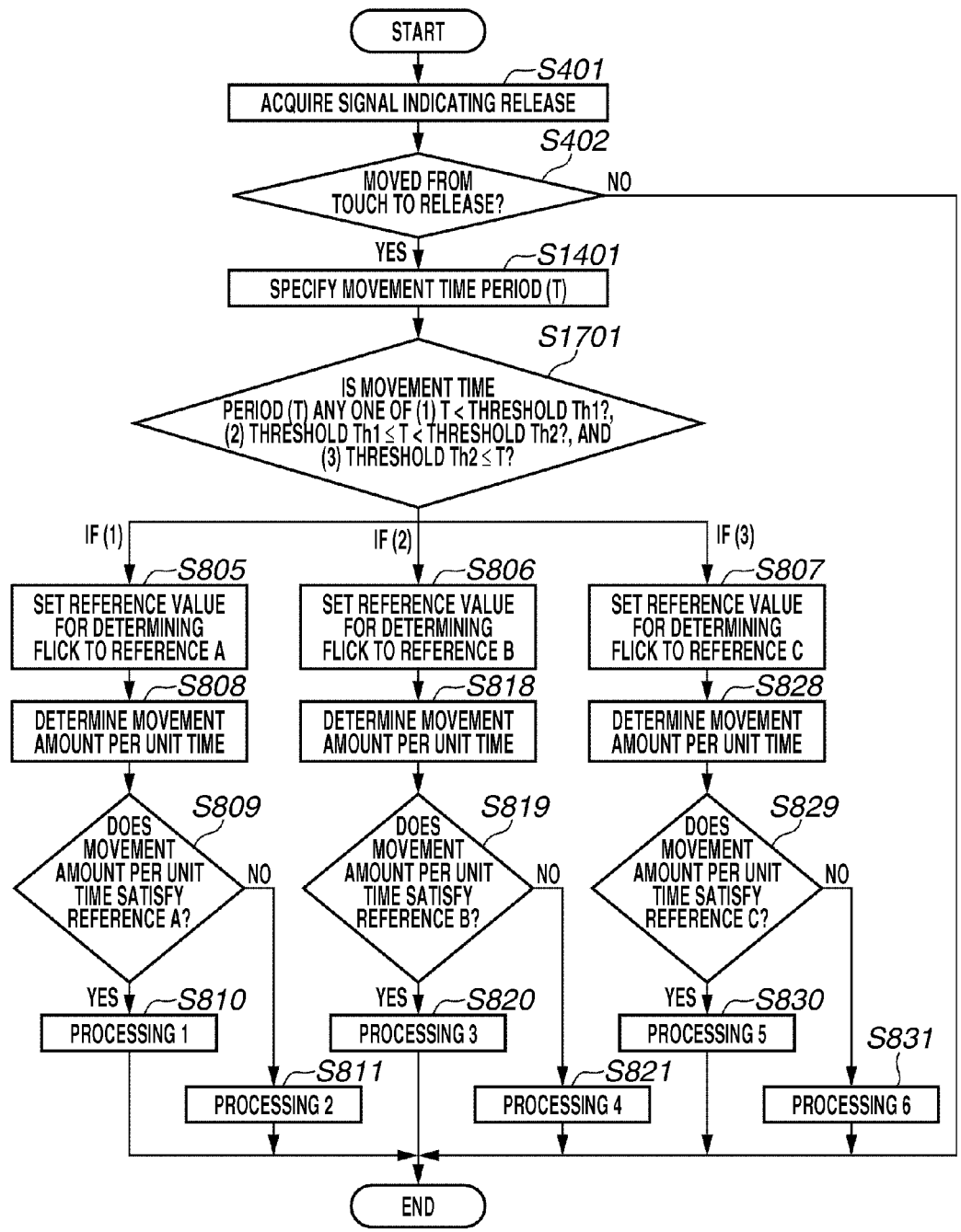

INFORMATION PROCESSING APPARATUS AND OPERATION METHOD THEREOF FOR DETERMINING A FLICK OPERATION OF A POINTER

BACKGROUND OF THE INVENTION

1. Field of the Invention

The present invention relates to a technique to determine an input operation of a user.

2. Description of the Related Art

In general, "drag" means that the position of a mouse cursor is shifted while continuously pressing a mouse button. Further, "drop" means that the continuously-pressed mouse button is then released.

Similarly, the "drag" also means that a touch position is shifted while a pointer such as a stylus or a finger touches an arbitrary position of a touch panel. Further, the "drop" also means that the touching finger is then separated from the touch panel.

In addition, "flick" means that the pointer touches an arbitrary position of the touch panel and is then released after performing sweeping-like operation thereon. For example, U.S. Pat. No. 7,761,814 discusses a technique to determine that the flick occurs when a movement speed at the position on a touch panel touched by a finger satisfies a predetermined reference value.

Moreover, such a technique is well known to inertially move an object displayed on a screen based on the sweeping-like direction of a flick after separating the finger from the touch panel with the flick.

However, the following problem may occur with a touch panel that can simultaneously receive the drag and the flick.

For example, it is assumed that a displayed object is moved to a desired position with the drag and the object is displayed at a drop position. However, the drag may be determined as a flick because the finger is moved and released with the sweeping-like operation when performing the drop, and the object can be moved on the screen in the detected direction of the sweeping-like operation.

SUMMARY OF THE INVENTION

The present invention is directed to an interface with high convenience for a user.

According to an aspect of the present invention, an information processing apparatus configured to determine a flick operation of a pointer includes a setting unit configured to set a reference pointer speed depending on an amount of movement of the pointer, and a determination unit configured to determine whether the flick operation of the pointer has occurred based on a movement speed of the pointer and the set pointer reference speed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate an example of an external view of a digital camera and an example of an external view of a touch panel.

FIGS. 3A to 3J illustrate examples of states where a touch position between a touch panel and a finger is moving.

FIGS. 4A and 4B are flowcharts illustrating examples of processing for determining a user operation.

FIGS. 5A and 5B illustrate examples of states where a touch position between the touch panel and the finger is moving.

FIGS. 14A and 14B are flowcharts illustrating examples of the processing for determining the user operation.

FIGS. 15A and 15B illustrate examples of states where each touch position between the touch panel and the finger is moving.

FIG. 17 is a flowchart illustrating an example of processing for determining the user operation.

DESCRIPTION OF THE EMBODIMENTS

Various exemplary embodiments, features, and aspects of the invention will be described in detail below with reference to the drawings.

Figure 1A:
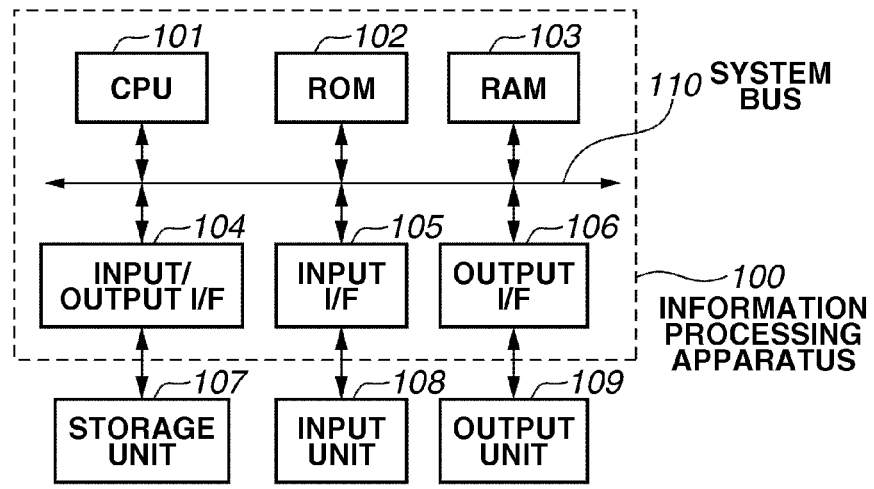
FIGS. 1A to 1C illustrate examples of hardware configurations and functional blocks of information processing apparatuses.

FIG. 1A illustrates an example of a hardware configuration of an information processing apparatus 100 according to a first exemplary embodiment of the present invention.

The information processing apparatus 100 includes a central processing unit (CPU) 101, a read only memory (ROM) 102, a random access memory (RAM) 103, an input/output interface (I/F) 104, an input interface (I/F) 105, and an output interface (I/F) 106.

The components are connected via a system bus 110 with each other. A storage unit 107, an input unit 108, and an output unit 109 are connected to the information processing apparatus 100. The components are described below.

The CPU 101 loads a program stored in the ROM 102 to the RAM 103 and executes the program, thereby realizing functional blocks to be described below. The ROM 102 stores the program to be executed by the CPU 101 or various data for executing the program. The RAM 103 provides a work area for loading the program stored in the ROM 102.

The input/output I/F 104 outputs, to the storage unit 107, output data as an execution result of various processing to be described below, and acquires data stored in the storage unit 107.

The input I/F 105 acquires a signal output from the input unit 108. The output I/F 106 outputs to the output unit 109 a signal for controlling the execution result of various kinds of processing or an image output.

The storage unit 107 is a hard disk drive, and stores data that is output as the execution result of various kinds of processing.

The input unit 108 is, e.g., a mouse, a track ball, a touch panel, a keyboard, or a button, and detects an input operation of a user and outputs a signal corresponding to the detected operation to the information processing apparatus 100.

The output unit 109 is, e.g., a liquid crystal display (LCD), and presents an image corresponding to the execution result of various kinds of processing or the signal for controlling the image output. If the input unit 108 is a liquid crystal panel, the input unit 108 also has a function of the output unit 109.

Figure 1B:
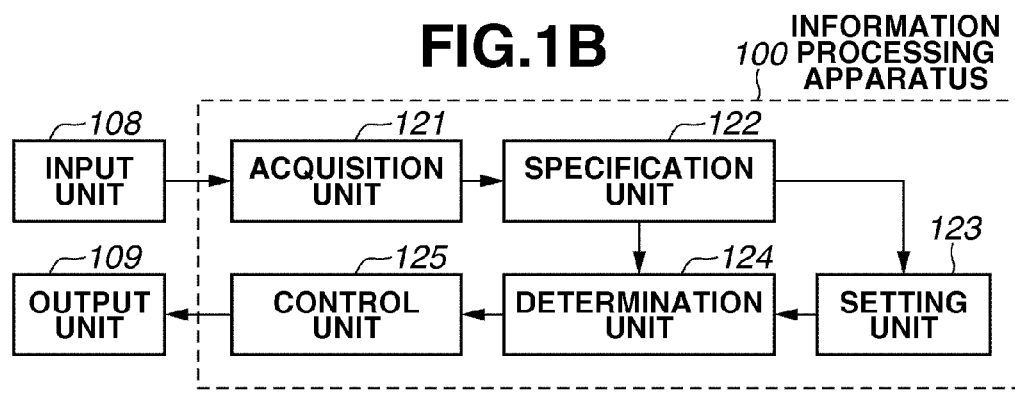

FIG. 1B is a functional block diagram illustrating a configuration of the information processing apparatus 100 according to the first exemplary embodiment of the present invention.

The information processing apparatus 100 includes an acquisition unit 121, a specification unit 122, a setting unit 123, a determination unit 124, and a control unit 125. The input unit 108 and the output unit 109 are connected to the information processing apparatus 100.

The CPU 101 loads the program stored in the ROM 102 to the RAM 103 and executes the program, thereby realizing the acquisition unit 121, the specification unit 122, the setting unit 123, the determination unit 124, and the control unit 125.

In this case, the CPU 101 may execute processing for reading data from the storage unit 107 or processing for writing data to the storage unit 107. Further, a plurality of storage units corresponding to the ROM 102 or the RAM 103 may be provided in the apparatus as necessary.

The components are described below. Similar components in FIG. 1A are designated by the same reference numerals, and descriptions thereof are omitted.

The acquisition unit 121 includes the input I/F 105, the CPU 101, the ROM 102, and the RAM 103. Further, the acquisition unit 121 acquires a signal output from the input unit 108, and outputs information corresponding to the acquired signal to the specification unit 122.

The information output to the specification unit 122 includes, e.g., a set of information indicating a position (position designated by a user) for detecting a user operation (pointing operation with a pointer using a stylus or a finger) and information indicating the timing for detecting the user operation.

The specification unit 122 includes the CPU 101, the ROM 102, and the RAM 103. Further, the specification unit 122 specifies an amount of movement of a target position based on the information output from the acquisition unit 121. If the input unit 108 is a liquid crystal touch panel, the target position is a position where the touch with the pointer on the touch panel is detected.

That is, the target position is a position where the pointer exists in an operation region. Further, the amount of movement of the target position means the movement distance when the touch position is moved while the pointer such as the finger touches the touch panel, and the contact pointer is then separated from the touch panel. In other words, the amount of movement of the target position means the amount of movement of the pointer.

The amount of movement specified by the specification unit 122 may be, e.g., a length of a locus for which the pointer on the touch panel is moved.

Alternatively, the amount of movement specified by the specification unit 122 may be a linear distance from the touch position of the pointer on the touch panel from the separating position of the pointer. Alternatively, the amount of movement specified by the specification unit 122 may be determined from a number of notification times of "a notification signal of movement of the pointer position" sent from the acquisition unit 121.

The setting unit 123 includes the CPU 101, and sets a reference value (reference speed) for determining the user operation as the flick according to the amount of movement of the target position. The amount of movement is an index for determining whether the target position is subsequently moved by assuming that the user performs the flick operation.

According to the present exemplary embodiment, the amount of movement is described as a typical example because the amount of movement is effective as the index. However, another index such as a movement time period can be alternatively used as the above-described index.

The determination unit 124 includes the CPU 101, and determines the user operation as the flick based on the amount of movement (movement speed) of the target position per unit time and the reference value set by the setting unit 123. The unit time is determined by the time at which the contact state is finally detected when the contact finger is separated from the touch panel and a time at a predetermined interval previously (e.g., 20 msec).

The control unit 125 includes the CPU 101 and the output I/F 106, and controls a signal output to the output unit 109 based on the determination result of the determination unit 124.

FIG. 2A illustrates an external view of a digital camera 200 as an example of the information processing apparatus 100.

The digital camera 200 includes a power button 201, a shutter button 202, a lens 203, and a touch panel 204. A finger 210 is of a user who performs the operation on the touch panel 204. The touch panel 204 corresponds to the input unit 108 and the output unit 109.

FIG. 2B illustrates an external view of an operation region (input region) on the touch panel 204. The operation region corresponds to the entire touch panel 204, or a partial region for recognizing the touch onto the touch panel 204.

According to the present exemplary embodiment, the operation region has 500 pixels in height and 900 pixels in width. On the operation region, at a position 211, the finger 210 starts to touch the touch panel 204, then is moved to a position 212 while keeping the touch, and is separated near the position 212 from the touch panel 204 in a sweeping-like manner.

FIGS. 3A to 3J illustrate states of a series of operations that the finger 210 touches the touch panel 204, is moved on the touch panel 204 while keeping the touch, and is separated from the touch panel 204.

According to the present exemplary embodiment, the power button 201 is operated, and the power is turned on. Then, the CPU 101 outputs a signal for detecting whether something is touching the touch panel 204, at a predetermined time interval (e.g., 20 msec).

If there is something touching the touch panel 204, the CPU 101 also outputs a signal for detecting a position (target position) of the touch. According to the present exemplary embodiment, the time when the power is on is set to 0 sec.

The finger 210 touches the touch panel 204 after 10 msec from the time when the power is turned on, and the finger 210 starts to move while keeping the touch to the touch panel 204. Then, the position at which the finger 210 touches the touch panel 204 after 20 msec is detected as the target position. The RAM 103 stores a set of the target position (coordinates) detected after 20 msec and information indicating the detection time.

Subsequently, the RAM 103 similarly stores the target position and the information detected at 20 msec time interval. If the finger 210 is separated from the touch panel 204 after 130 msec, it is determined that nothing is touching the touch panel 204 after 140 msec.

That is, the touch between the finger 210 and the touch panel 204 continues from 10 msec to 130 msec. In the digital camera 200, it is determined that the touch between the finger 210 and the touch panel 204 continues from 20 msec to 120 msec.

Depending on the situation, detection accuracy of the amount of movement may be varied to a certain degree. Therefore, it is possible to substitute a value corresponding to the movement of the position where the touch is detected as the amount of movement of the target position.

According to the present exemplary embodiment, the amount of movement is the distance between the position where the touch, between the finger 210 and the touch panel 204, starts and the position where the touch, between the finger 210 and the touch panel 204, ends. However, the present invention is not limited thereto.

FIG. 4A is a flowchart illustrating a processing flow for determining the user operation.

In step S401, the acquisition unit 121 acquires a signal indicating the release of the pointing with the pointer. The signal indicating the release is a signal indicating that it is determined that the state has changed from a state in which the finger 210 or the like touches the touch panel 204 to a state where the touching ceases".

In step S402, the specification unit 122 determines whether the target position (position of the pointer) where the touch is detected is moved during the time period from the start of touch to the touch panel 204 to the end (release) thereof. If a small amount of movement (movement of the pointer) of the target position where the touch is detected, it may be determined that the target position is not moved. If the amount of movement is 10 pixels or smaller, it may be determined that the target position is not moved.

If the specification unit 122 determines that the target position where the touch is detected is moved (YES in step S402), processing in step S403 is executed. On the other hand, if the specification unit 122 determines that the target position where the touch is detected is not moved (NO in step S402), a series of processing ends.

In step S403, the specification unit 122 specifies the amount of movement (the amount of movement of the pointer) indicating the movement of the target position where the touch is detected. In step S404, the setting unit 123 determines whether the amount of movement is larger than a predetermined threshold (e.g., 300 pixels).

If the setting unit 123 determines that the amount of movement is larger than the predetermined threshold (YES in step S404), processing in step S405 is executed. If the setting unit 123 determines that the amount of movement is not larger than the predetermined threshold (NO in step S404), processing in step S406 is executed.

In step S405, the setting unit 123 changes the reference value for determining the user operation (movement of the pointer) as the flick operation. According to the present exemplary embodiment, as a first reference speed, the reference value is preset to 0.5 pixel/msec.

In step S405, the reference value is changed to a second reference speed, i.e., 2.7 pixels/msec that is larger than 0.5 pixel/msec. In step S406, the determination unit 124 determines the amount of movement (the amount of partial movement) per unit time.

The amount of movement per unit time is obtained from the position where the touch is finally detected before the release and the position where the touch is detected at a different time before the time when the touch is finally detected before the release.

The amount of movement per unit time may be obtained from the position where the touch is detected after 120 msec as illustrated in FIGS. 3A to 3J and the position where the touch is detected after 100 msec.

In step S407, the determination unit 124 determines whether the amount of movement (the movement speed of the pointer) satisfies the reference value (that is, the amount of movement is larger than the reference value).

If the determination unit 124 determines that the amount of movement satisfies the reference value (YES in step S407), processing in step S408 is executed. If the determination unit 124 determines that the amount of movement does not satisfy the reference value (NO in step S407), a series of processing ends. In step S408, the determination unit 124 outputs a signal indicating the flick to the control unit 125.

FIGS. 5A and 5B illustrate states in which the position where the touch is detected between the finger 210 and the touch panel 204 is moving.

FIG. 5A illustrates an example in which the amount of movement just before the flick operation is relatively large, and the flick operation does not thus occur. Referring to FIG. 5A, the touch between the finger 210 and the touch panel 204 starts at a position 501, and then ends at a position 502. The amount of movement from the positions 501 to 502 is 400 pixels.

The amount of movement per unit time is calculated as 2.5 pixels/msec based on the position where the touch is finally detected the release and the position where the touch is detected before 20 msec previously. At this time, the determination unit 124 does not output the signal indicating the flick operation to the control unit 125. In this case, a series of operations in FIG. 5A is determined as the drag and drop, not as the flick operation.

FIG. 5B illustrates an example in which the flick operation occurs because the amount of movement just before the flick operation is relatively small. Referring to FIG. 5B, the finger 210 starts to touch the touch panel 204 at a position 511, and the touch therebetween ends at a position 512.

The amount of movement from the positions 511 to 512 is 200 pixels. The amount of movement is 0.7 pixels/msec per unit time, calculated based on the position where the touch is finally detected before the release and the position where the touch is detected before 20 msec thereof.

At this time, the determination unit 124 outputs the signal indicating the flick operation to the control unit 125. That is, a series of the operations in FIG. 5B is determined as the flick operation.

FIGS. 6A to 6E illustrate examples of processing executed by the control unit 125 according to the present exemplary embodiment.

An image 600 is displayed on the touch panel 204, and contains a flower 601. A consideration is given of the case in which the image 600 is enlarged and is partially displayed on the touch panel 204.

Figure 6A:
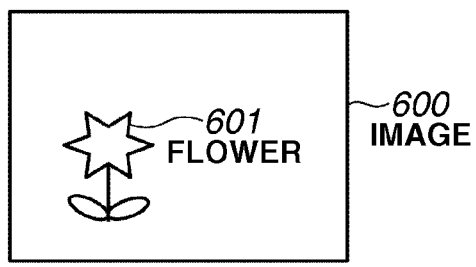
FIGS. 6A to 6E illustrate examples of states where a display position of an object is moving.
Figure 6B:
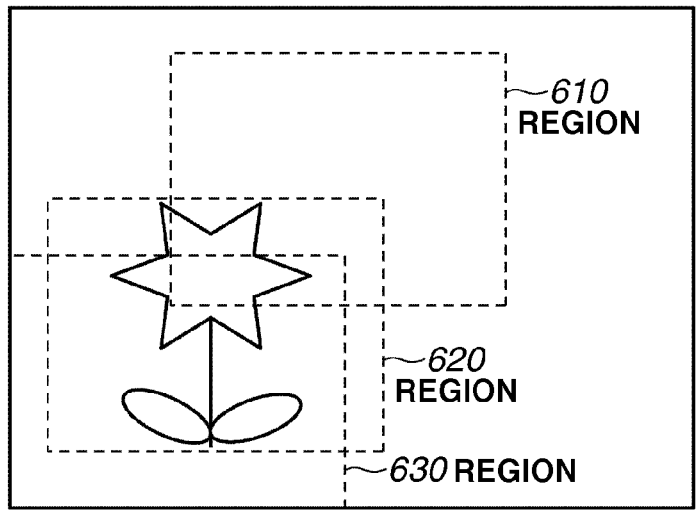
Figure 6C:
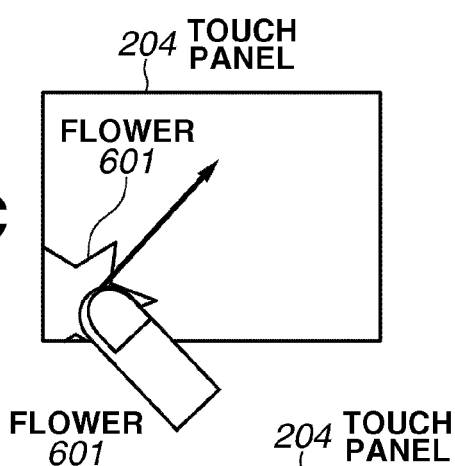
Figure 6E:
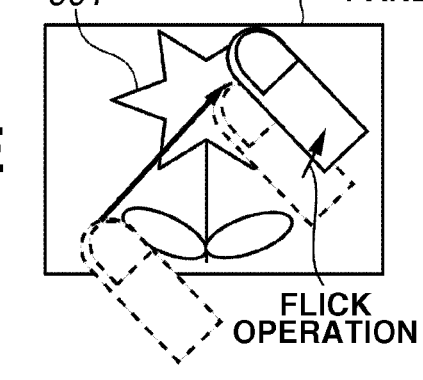

FIG. 6C illustrates a part of the image 600 displayed on the touch panel 204. The display part of the image 600 in FIG. 6C corresponds to a region 610 in FIG. 6B.

Next, drag is performed to move the flower 601 near the center of the touch panel 204. With the drag, the touching finger 210 is moved by the amount of movement significant for the user.

Figure 6D:
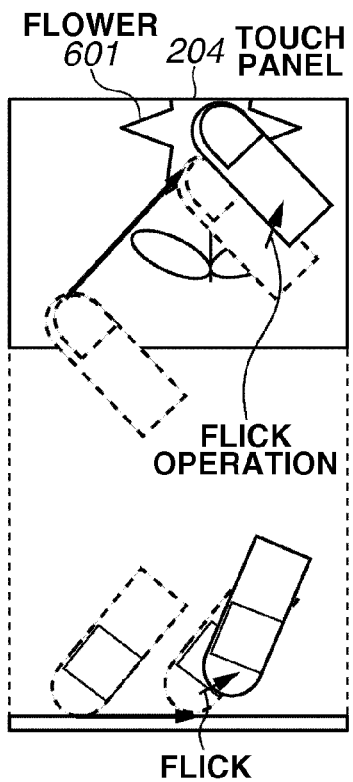

Referring to FIG. 6D, with various conventional apparatuses, the operation is determined as the flick by separating the finger 210 from the touch panel 204 with a sweeping-like manner. That is, it is simply determined in many cases that the flick operation occurs sequentially to the drag operation.

In this case, the display region is inertially moved in the detected direction of the sweeping operation. That is, the touch panel 204 displays an image corresponding to a region 630 in many cases, not a region 620 desired by the user.

However, according to the present exemplary embodiment, even when the finger 210 is separated from the touch panel 204 with a sweeping-like manner, if the amount of movement before the operation is relatively large, the operation is difficult to be determined as the flick. Referring to FIG. 6F, an image corresponding to the region 620 is displayed on the touch panel 204.

According to the present exemplary embodiment, it is more difficult to perform the flick operation sequentially to the drag operation with a certain amount of movement than the flick operation performed with little drag operation.

Figure 12A:
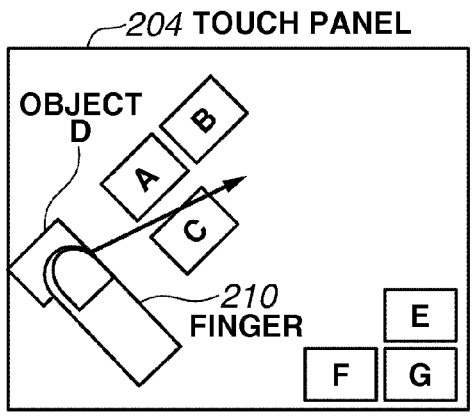
FIGS. 12A to 12F illustrate examples of states where display positions of objects are moving.

FIGS. 12A to 12F illustrate other examples of the processing executed by the control unit 125 according to the present exemplary embodiment. As illustrated in FIG. 12A, the touch panel 204 displays objects A to G. The objects A to G can be arranged at arbitrary positions.

When the object D is moved to the vicinity of the objects A to C, the finger 210 touches the display position of object D.

Figure 12B:
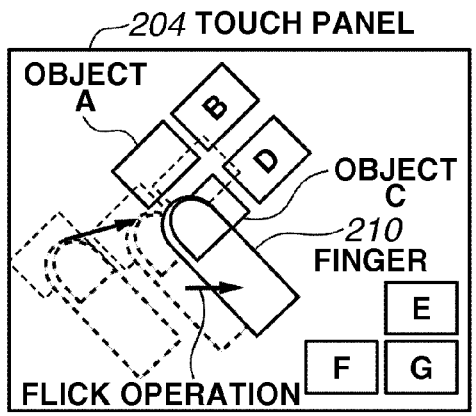

Subsequently, as illustrated in FIG. 12B, the finger 210 may be moved so that the amount of movement is not larger than the threshold. Further, the finger 210 may be separated from the touch panel 204 so that the movement speed is faster than the first reference speed. This causes the flick operation. The object D is slid on the screen while the finger 210 is separated from the object D, and is thus moved to the vicinity of the objects A to C.

Figure 12C:
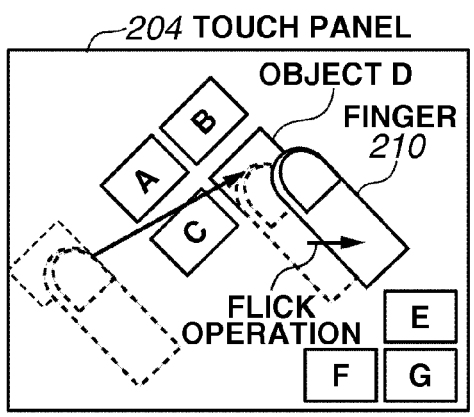

As illustrated in FIG. 12C, the finger 210 is moved so that the amount of movement exceeds the threshold. Further, the finger 210 may be separated from the touch panel 204 so that the movement speed does not exceed the second reference speed faster than the first reference speed. In this case, only with the drag operation, the object D is slid on the screen during the drag operation, and is moved to the vicinity of the objects A to C.

In FIGS. 12B and 12C, the object D is moved to the same position. As described above according to the present exemplary embodiment, the user can separately use the operations with convenience by appropriate setting of the reference value for determining the flick operation.

Figure 12D:
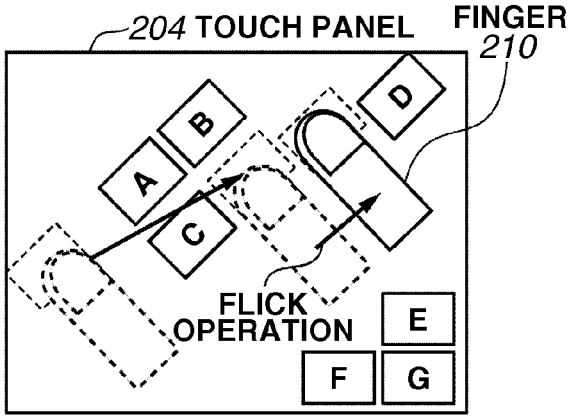
Figure 12E:
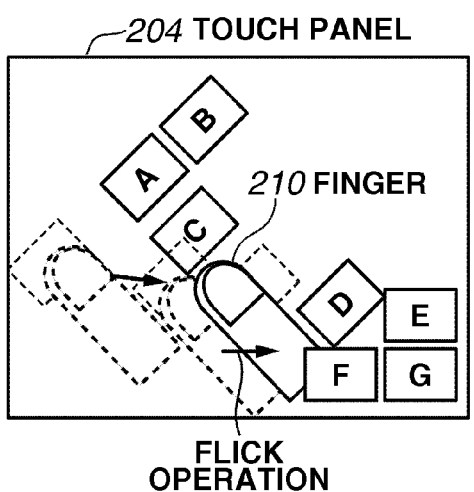
Figure 12F:
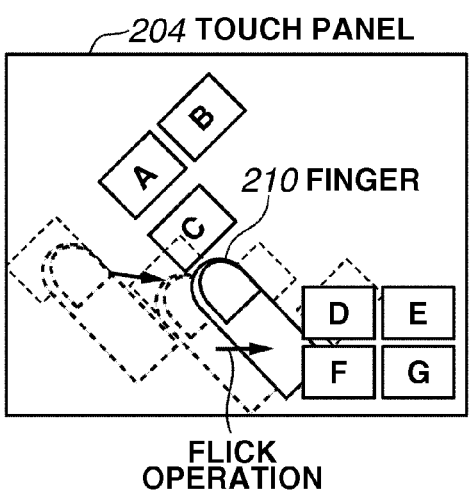

When the object D is not disposed around the objects A to C, the following operation may be performed. As illustrated in FIG. 12D, the finger 210 is moved so that the amount of movement exceeds the threshold, and the finger 210 is then separated from the touch panel 204 so that the movement speed is faster than the second reference speed that is faster than the first reference speed.

As a result, the flick operation is executed sequentially to the drag operation, thereby moving the object D with the amount of movement larger than those in FIGS. 12B and 12C.

FIG. 4B is a flowchart illustrating a processing flow of the user operation according to a modification of the first exemplary embodiment. Referring to FIG. 4B, in place of the processing in step S404, processing in step S414 is executed. Further, in place of the processing in step S405, processing in step S415 is executed. Similar processing is designated by the same reference numeral and description thereof is omitted.

In step S414, the setting unit 123 determines whether the amount of movement is larger than a predetermined threshold (e.g., 300 pixels). If the setting unit 123 determines that the amount of movement is not larger than the predetermined threshold (NO in step S414), the setting unit 123 executes processing in step S415. If the setting unit 123 determines that the amount of movement is larger than the predetermined threshold (YES in step S414), the setting unit 123 executes the processing in step S406.

In step S415, the setting unit 123 changes the reference value for determining the user operation as the flick operation. According to the present exemplary embodiment, the reference value is preset as 2.7 pixels/msec. In step S415, the reference value is changed to, e.g., 0.5 pixel/msec smaller than 2.7 pixels/msec.

According to the above-described exemplary embodiments, the amount of movement of the target position starts the movement distance between when the touch position starts moving while keeping the touch between the finger 210 and the touch panel 204 and when the finger 210 is separated from the touch panel 204.

The present invention is not limited thereto. The amount of movement of the target position can be a length of the locus when the touch position is moved while the finger 210 touches the touch panel 204.

Alternatively, a plurality of partial regions having the same size is provided on the touch panel 204. Then, the amount of movement of the target position may be the number of the partial regions through which the finger 210 passes when moving the touch position while the finger 210 touches the touch panel 204.

Alternatively, a grid is set to the touch panel 204. Then, the amount of movement of the target position may be the number of grids through which the finger 210 passes when moving the touch position while the finger 210 touches the touch panel 204. Depending on the type of the amount of movement of the target position, the type of thresholds is changed.

Alternatively, the touch position is moved to change the direction on the way. Then, the amount of movement of the target position may be addition of the amounts of movement in the changed directions.

The threshold in the present exemplary embodiment may not be fixed. Alternatively, as the specified amount of movement is larger, a higher reference value may be set.

According to a second exemplary embodiment of the present invention, a description is given of another example of processing for determining the user operation. According to the present exemplary embodiment, a configuration of an information processing apparatus is similar to that of the first exemplary embodiment. Therefore, description thereof is omitted.

Figure 7A:
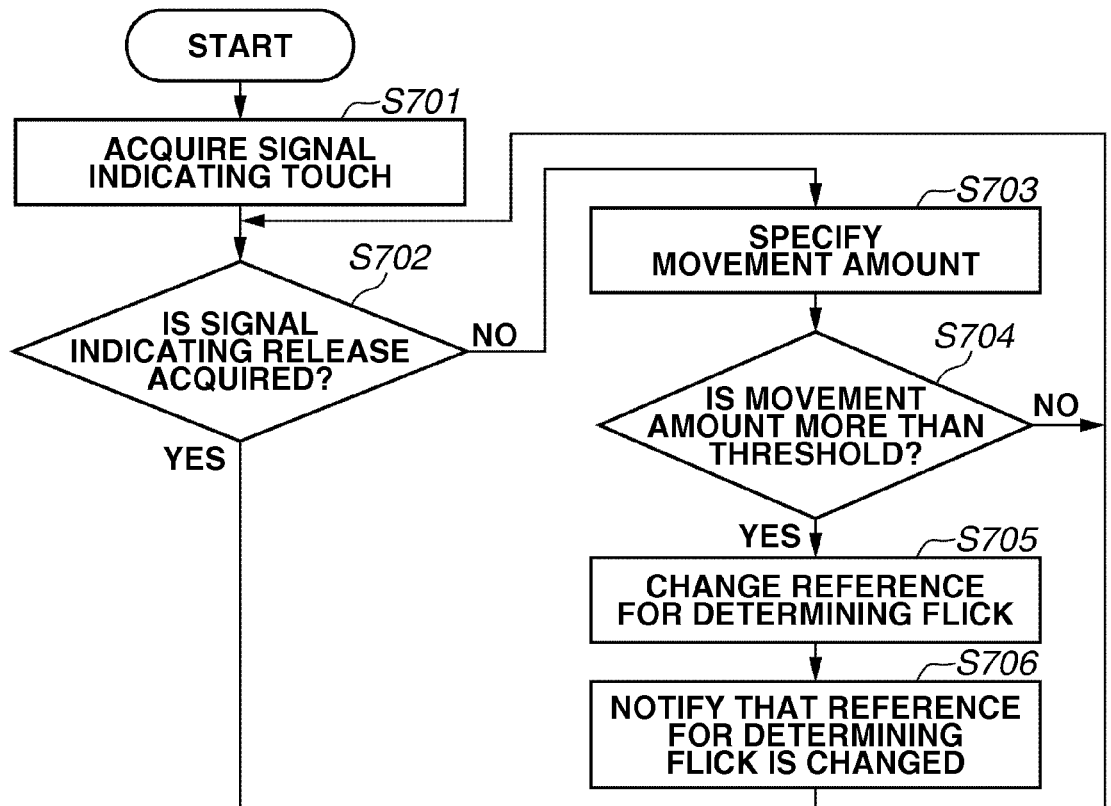
FIGS. 7A and 7B are flowcharts illustrating examples of processing for determining the user operation.

FIG. 7A is a flowchart illustrating a processing flow for determining the user operation.

In step S701, the acquisition unit 121 acquires a signal indicating the touch to the touch panel 204. In step S702, the acquisition unit 121 determines whether a signal indicating the release is acquired.

If the acquisition unit 121 determines that the signal indicating the release is acquired (YES in step S702), processing in step S707 is executed. If the acquisition unit 121 does not acquire the signal indicating the release (NO in step S702), processing in step S703 is executed.

In step S703, the specification unit 122 specifies the amount of movement of the target position (position where the touch is detected). The amount of movement of the target position corresponds to the movement distance when the touch position of the finger 210 is moved while the finger 210 touches the touch panel 204.

In step S704, the setting unit 123 determines whether the amount of movement is larger than a threshold (e.g., 300 pixels). If the setting unit 123 determines that the amount of movement is larger than the threshold (YES in step S704), processing in step S705 is executed. If the setting unit 123 determines that the amount of movement is not larger than the threshold (NO in step S704), the processing in step S702 is executed.

In step S705, the setting unit 123 executes the processing for changing the reference value for determining the user operation as the flick operation. In step S705, the reference value is preset as 0.5 pixel/msec, similar to that of the first exemplary embodiment. In step S705, the reference value is changed to 2.7 pixels/msec that is larger than 0.5 pixel/msec.

In step S706, the control unit 125 executes the processing for notifying the change of the reference value for determining the user operation as the flick operation. The touch panel 204 displays the notification indicating the change of the reference value for determining the user operation as the flick operation.

If the output unit 109 has a speaker or a motor, a notification indicating the change of the reference value for determining the user operation as the flick operation may be issued by using sounds or vibrations.

Since processing in steps S707 to S709 is similar to that in steps S406 to S408, description thereof is omitted.

Figure 7B:
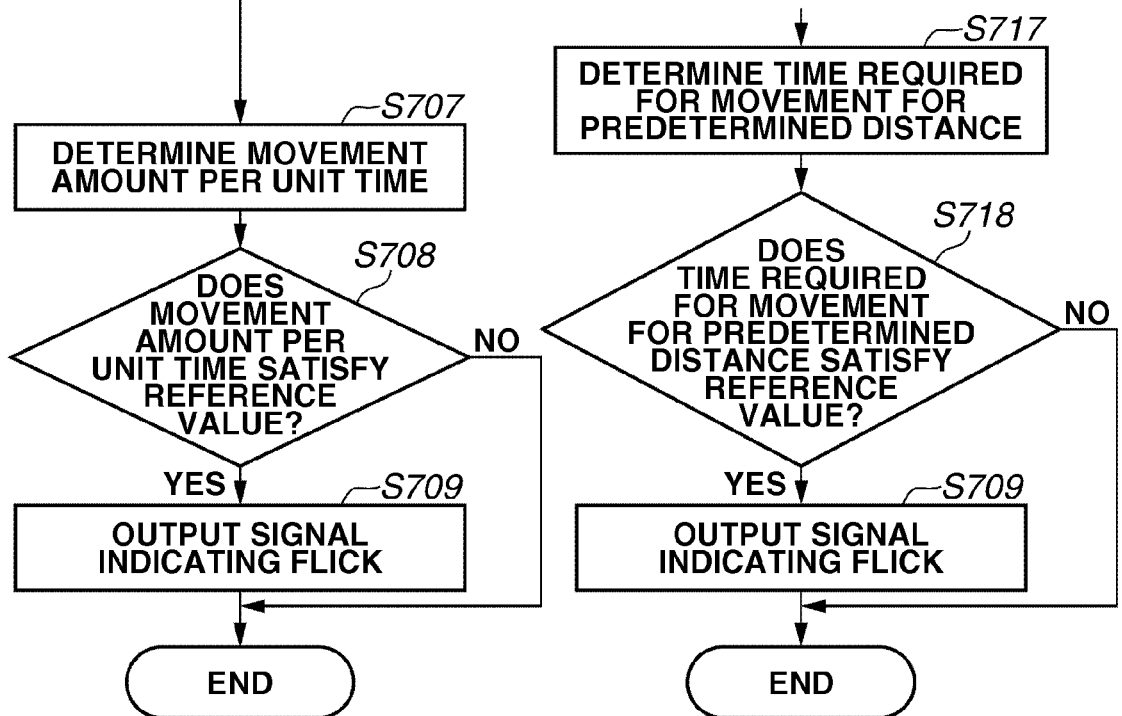

FIG. 7B is a flowchart illustrating another example of the processing for determining the user operation according to the present exemplary embodiment.

Referring to FIG. 7B, processing in step S717 is executed in place of that in step S707, and processing in step S718 is further executed in place of that in step S708. Similar processing is designated by the same reference numeral and description thereof is omitted.

In step S717, the determination unit 124 determines the amount of time for movement required for a predetermined distance (e.g., 80 pixels). The predetermined distance is obtained from a set of information indicating a first time when the touch is finally detected before the release and a position where the touch is detected at the first time, and a set of information indicating a second time different from the first time and a position where the touch is detected at the second time.

In step S718, the determination unit 124 determines whether the amount of time required for movement for the predetermined distance satisfies a predetermined reference value (e.g., whether the amount of time is shorter than 40 msec). If the determination unit 124 determines that the amount of time satisfies the predetermined reference value (YES in step S718), processing in step S709 is executed. If the determination unit 124 determines that the amount of time does not satisfy the predetermined reference value (NO in step S718), a series of processing ends.

The preset reference value and the reference value changed in step S705 are set as information indicating a time according to the processing in step S717.

According to a third exemplary embodiment of the present invention, a description is given of another example of the processing for determining the user operation. According to the present exemplary embodiment, a configuration of an information processing apparatus is similar to that of the first exemplary embodiment. Hence, description thereof is omitted.

Figure 8:
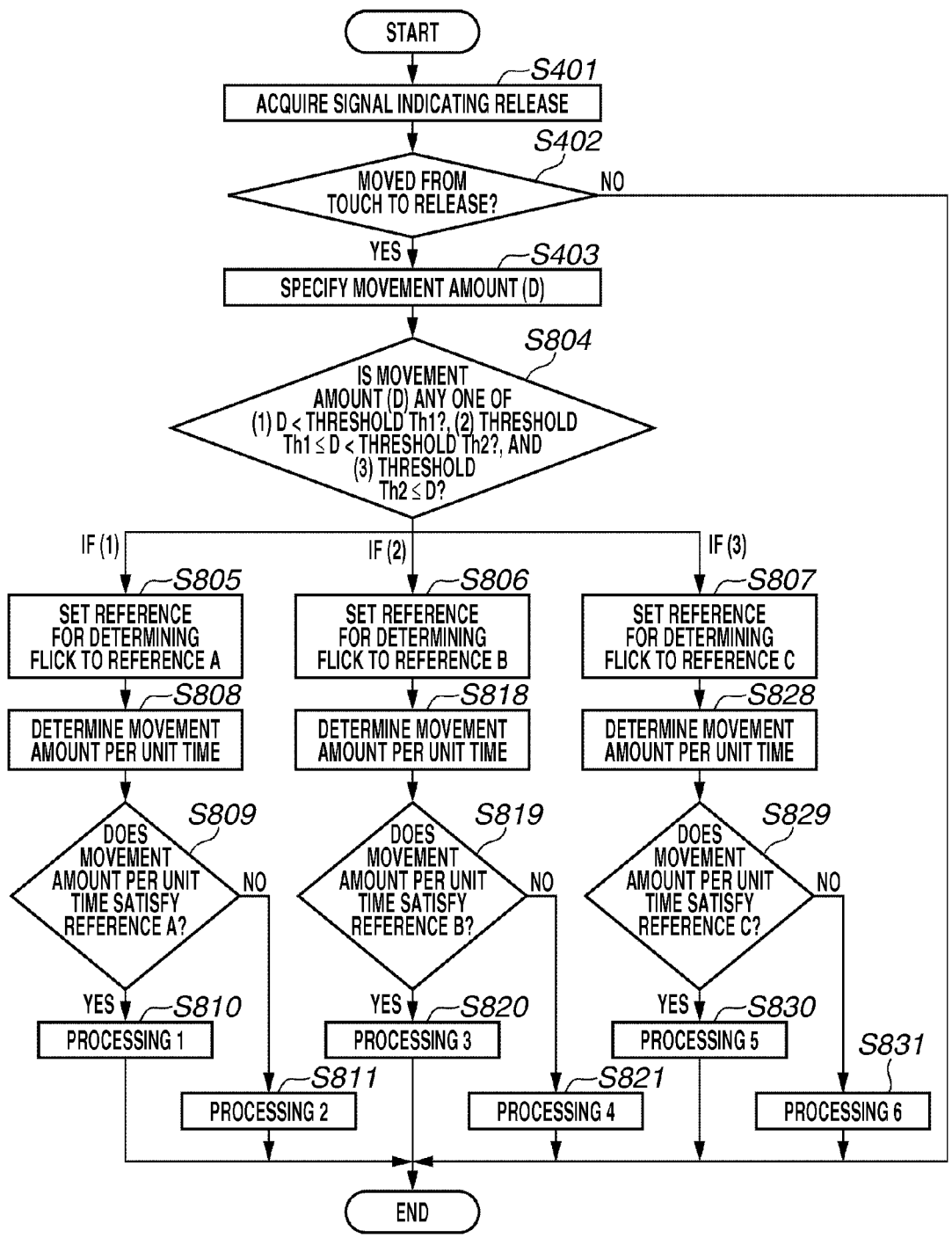
FIG. 8 is a flowchart illustrating an example of processing for determining the user operation.

FIG. 8 is a flowchart illustrating a processing flow for determining the user operation. Similar processing to that in FIGS. 4A and 4B is designated by the same reference numeral, and description thereof is omitted.

In step S804, the setting unit 123 determines whether the specified amount of movement is any of (1) smaller than a first threshold Th1, (2) the first threshold Th1 or larger and smaller than a second threshold Th2, and (3) the second threshold Th2 or larger (Th1<Th2). The first threshold Th1 is, e.g., 300 pixels, and the second threshold Th2 is, e.g., 600 pixels.

If (1), that is, the amount of movement is smaller than the threshold Th1, processing in step S805 is executed. If (2), that is, the amount of movement is the first threshold Th1 or larger and is smaller than the second threshold Th2, processing in step S806 is executed. If (3), that is, the amount of movement is the second threshold Th2 or larger, processing in step S807 is executed.

In step S805, the setting unit 123 sets the reference value for determining the flick operation to a reference A (e.g., 0.5 pixel/msec). In step S806, the setting unit 123 sets the reference value for determining the flick operation to a reference B (e.g., 1.5 pixels/msec).

In step S807, the setting unit 123 sets the reference value for determining the flick operation to a reference C (e.g., 2.5 pixels/msec). In steps S808, 818, and 828, the determination unit 124 determines the amount of movement per unit time. In step S809, the determination unit 124 determines whether the amount of movement per unit time satisfies the reference A.

If the determination unit 124 determines that the amount of movement per unit time satisfies the reference A (YES in step S809), processing in step S810 is executed. If the determination unit 124 determines that the amount of movement per unit time does not satisfy the reference A (NO in step S809), processing in step S811 is executed.

In step S819, the determination unit 124 determines whether the amount of movement per unit time satisfies the reference B. If the determination unit 124 determines that the amount of movement per unit time satisfies the reference B (YES in step S819), processing in step S820 is executed. If the determination unit 124 determines that the amount of movement per unit time does not satisfy the reference B (NO in step S819), processing in step S821 is executed.

In step S829, the determination unit 124 determines whether the amount of movement per unit time satisfies the reference C. If the determination unit 124 determines that the amount of movement per unit time satisfies the reference C (YES in step S829), processing in step S830 is executed. If the determination unit 124 determines that the amount of movement per unit time does not satisfy the reference C (NO in step S829), processing in step S831 is executed.

In steps S810, S811, S820, S821, S830, and S831, the control unit 125 executes the respective control operations. In the respective control operations, for example, insteps S810 and S820, the control unit 125 executes the control operation corresponding to the flick.

In steps S811 and S830, the control unit 125 executes the control operation corresponding to the drag and drop. In steps S821 and S831, the control unit 125 executes the control operation corresponding to the handwriting recognition.

If applying the above-described exemplary embodiment to an apparatus including the touch panel 204 (operation region) of a small size, a movable range of the finger 210 is narrow. Therefore, the screen size influences the movement of the finger 210 in the flick operation.

According to a fourth exemplary embodiment of the present invention, it is further devised to prevent such an influence. According to the present exemplary embodiment, thresholds in the height and width directions are set corresponding to the height and width of the touch panel 204 (operation region). According to the present exemplary embodiment, a hardware configuration of an information processing apparatus is similar to that illustrated in FIG. 1A, and description thereof is omitted.

Figure 1C:
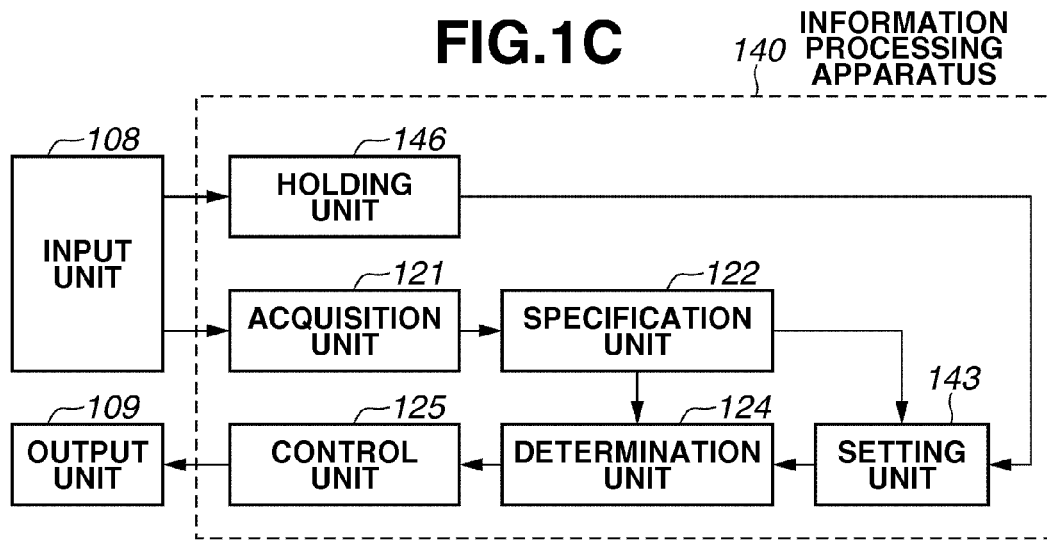

FIG. 1C is a functional block diagram illustrating a configuration of an information processing apparatus 140 according to the present exemplary embodiment.

The information processing apparatus 140 includes the acquisition unit 121, the specification unit 122, the setting unit 143, the determination unit 124, the control unit 125, and a holding unit 146. A similar component to that in FIG. 1B is designated by the same reference numeral, and a description thereof is omitted.

The holding unit 146 includes a CPU, and holds information indicating the size of the operation region. If the information processing apparatus 140 is the digital camera 200 in FIG. 2A, the operation region corresponds to the entire touch panel 204, or a partial region where the touch is recognized on the touch panel 204.

The information indicating the size of the operation region has 500 pixels in height and 900 pixels in width. The setting unit 143 includes a CPU, and respectively sets thresholds in height and width directions based on the information indicating the size of the operation region.

Figure 9:
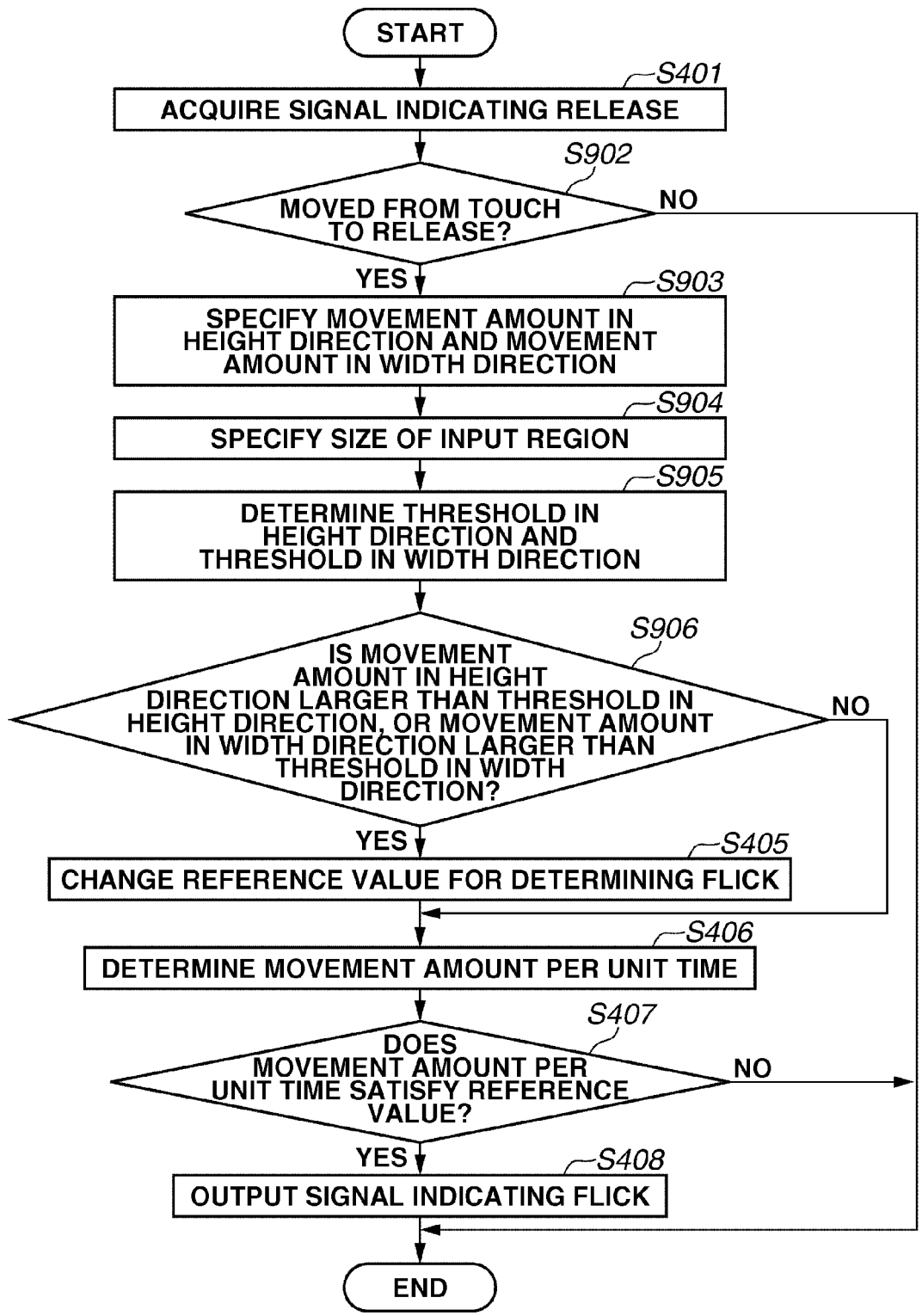
FIG. 9 is a flowchart illustrating an example of processing for determining the user operation.

FIG. 9 is a flowchart illustrating a processing flow for determining the user operation. Similar processing to that in FIG. 4A is designated by the same reference numeral, and description thereof is omitted.

In step S902, the specification unit 122 determines whether the position where the touch is detected is moved. If the specification unit 122 determines that the position where the touch is detected is moved (YES in step S902), processing in step S903 is executed. If the specification unit 122 determines that the position where the touch is detected is not moved (NO in step S902), a series of processing ends.

In step S903, the specification unit 122 specifies the amounts of movement in the height and width directions among the amounts of movement indicating the movement of the position where the touch is detected. In step S904, the setting unit 123 specifies the size of the operation region based on the information held in the holding unit 146.

In step S905, the setting unit 123 determines the threshold in the height and width directions according to the size of the specified operation region. If the specified size of the operation region has 500 pixels in height and 900 pixels in width, referring to as illustrated in FIG. 2B, the setting unit 123 sets the threshold in the height direction to 170 pixels and the threshold in the width direction to 300 pixels.

If the height is shorter than the width, the threshold in the height direction may be smaller than the threshold in the width direction. In step S906, the setting unit 123 determines whether the amount of movement in the height direction is larger than a threshold corresponding to the movement in the height direction and/or whether the amount of movement in the width direction is larger than a threshold corresponding to the movement in the width direction.

If the setting unit 123 determines that the amount of movement in the height direction is larger than the threshold corresponding to the movement in the height direction and/or the amount of movement in the width direction is larger than the threshold corresponding to the movement in the width direction (YES in step S906), the processing in step S405 is executed.

On the other hand, if the setting unit 123 determines that the amount of movement in the height direction is not larger than the threshold corresponding to the movement in the height direction and the amount of movement in the width direction is not larger than the threshold corresponding to the movement in the width direction (NO in step S906), the processing in step S406 is executed.

In step S405, the setting unit 143 may also set individual values in the height and width directions to the reference values for determining the flick operation based on the size of the operation region determined in step S904.

It is possible to perform the processing for determining the user operation as the flick operation corresponding to the height and width lengths of the touch panel 204 (operation region). If the size of the operation region is changed depending on a plurality of modes, the user operation can also be determined as the flick operation, corresponding to the height and width in the individual modes. As a consequence, the user operability is improved.

According to a fifth exemplary embodiment of the present invention, description is given of another example of the processing for determining the user operation. A configuration of an information processing apparatus according to the present exemplary embodiment is similar to that of the fourth exemplary embodiment, and description thereof is thus omitted. The setting unit 143 further sets a threshold in the diagonal direction based on the height and width of the operation region.

Figure 10:
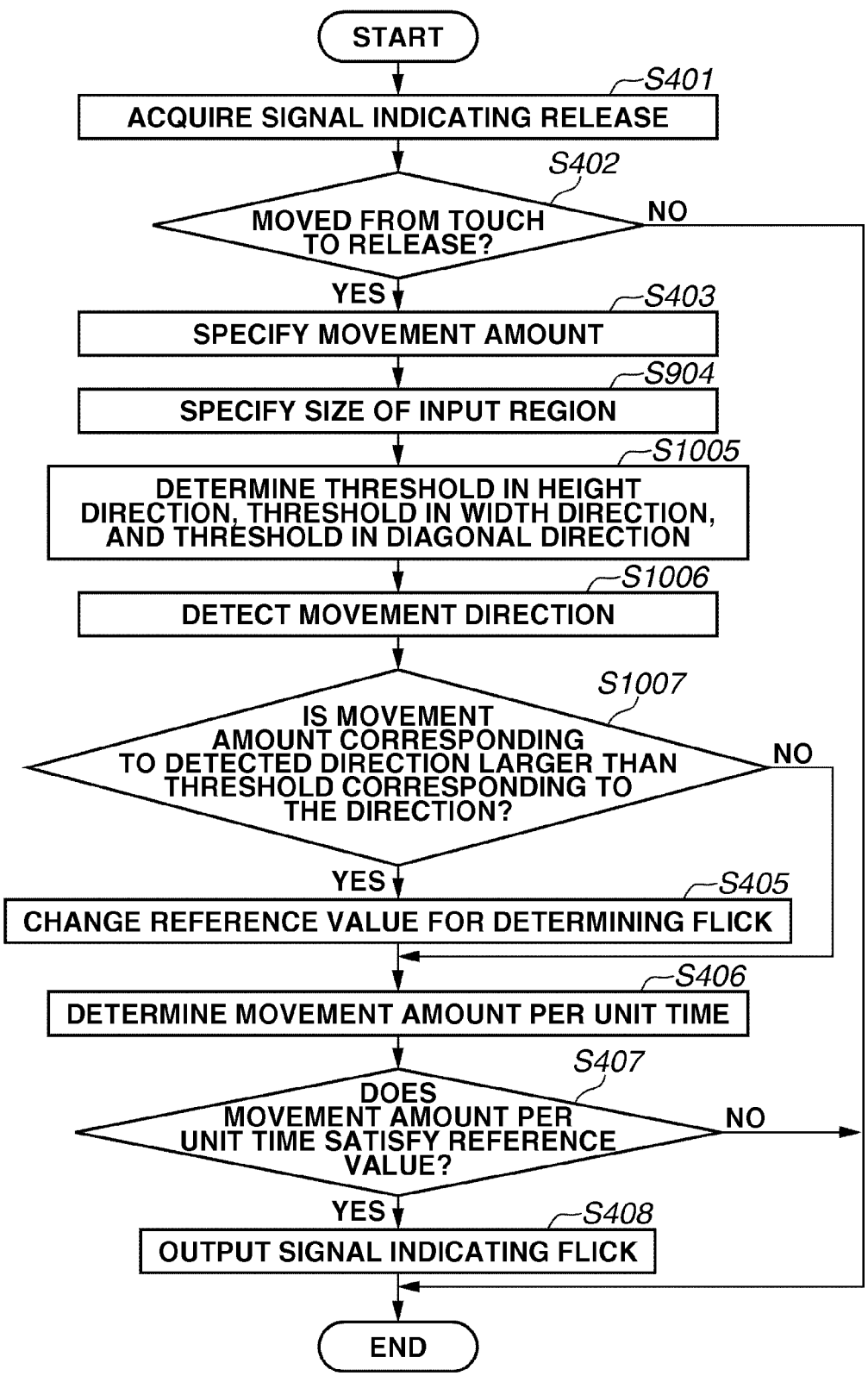
FIG. 10 is a flowchart illustrating an example of processing for determining the user operation.

FIG. 10 illustrates a flowchart of a processing flow for determining the user operation. Similar processing to that in FIGS. 4A and 9 is designated by the same reference numeral, and description thereof is omitted.

In step S1005, the setting unit 143 determines the thresholds in the height, width, and diagonal directions. In step S1006, the determination unit 124 detects the movement direction in any of the height, width, and diagonal directions.

As a detection method of the movement direction, the movement direction is determined based on an angle formed by a line segment connecting the position where the touch is finally detected before the release and the position where the touch is detected at a different time prior to the time when the touch is finally detected before the release.

Figure 11:
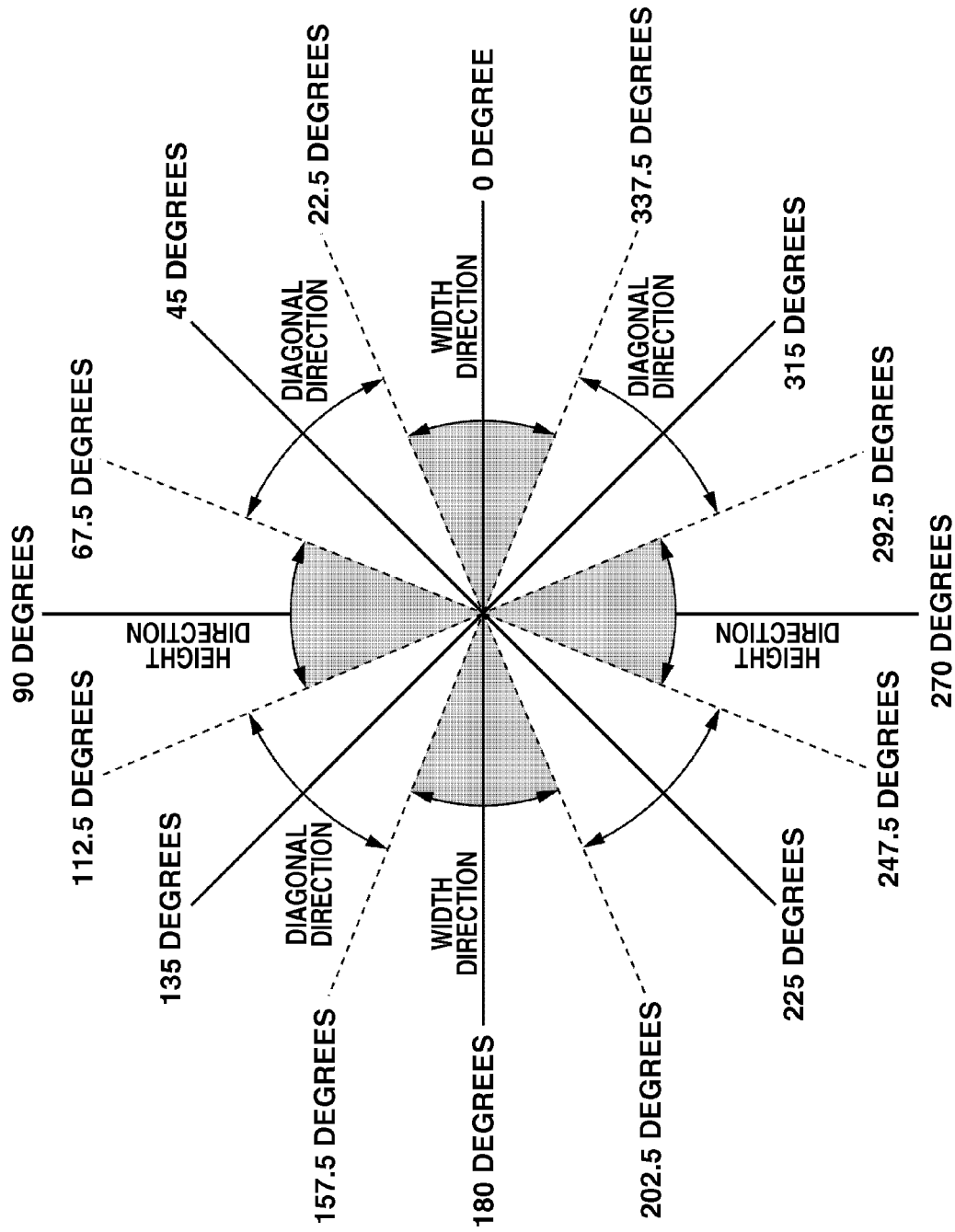
FIG. 11 illustrates a relation between a direction in which a sweeping operation is detected and a movement direction of the object.

As another detection method of the movement direction, the movement direction is determined based on an angle formed by a line segment connecting the position where the touch is first detected and the position where the touch is finally detected before the touch ceases. As illustrated in FIG. 11, the movement direction may be determined corresponding to the determined angle.

In an example illustrated in FIG. 11, if the angle is anyone of "0 degree or larger and smaller than 22.5 degrees", "337.5 degrees or larger and smaller than 360 degrees", and "157.5 degrees or larger and smaller than 202.5 degrees", the determination unit 124 determines that the movement is in the width direction. If the angle is any one of "22.5 degrees or larger and smaller than 67.5 degrees", "112.5 degrees or larger and smaller than 157.5 degrees", "202.5 degrees or larger and smaller than 247.5 degrees", and "292.5 degrees or larger and smaller than 337.5 degrees", the determination unit 124 determines that the movement is in the diagonal direction. If the angle is any of one of "67.5 degrees or larger and smaller than 112.5 degrees", and "247.5 degrees or larger and smaller than 292.5 degrees", the determination unit 124 determines that the movement is in the height direction.

In step S1007, the determination unit 124 determines whether the amount of movement corresponding to the detected direction is larger than a threshold corresponding to the direction. If the determination unit 124 determines that the amount of movement is larger than the threshold (YES in step S1007), the processing in step S405 is executed. If the determination unit 124 determines that the amount of movement is not larger than the threshold (NO in step S1007), the processing in step S406 is executed.

In step S405, the setting unit 143 may also set individual values in the height, width, and diagonal directions to the reference values for determining the flick operation based on the size of the operation region specified in step S904.

According to the present exemplary embodiment, it is possible to discriminate the individual movements in the height, width, and diagonal directions. Therefore, it is effective when the processing is changed depending on the movement direction of the target position.

According to a sixth exemplary embodiment of the present invention, a description is given of another example of the processing for determining the user operation. A hardware configuration of an information processing apparatus according to the present exemplary embodiment is similar to that of the first exemplary embodiment. Hence, description thereof is omitted.

Figure 13A:
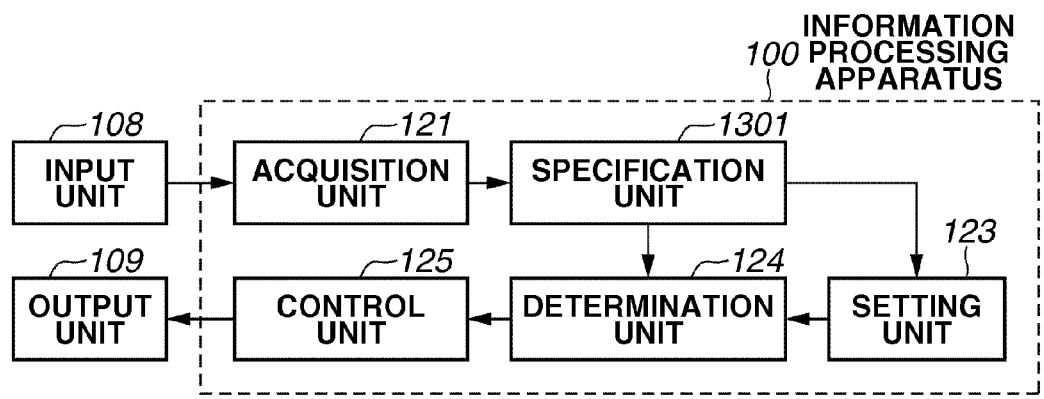
FIGS. 13A and 13B illustrate examples of functional blocks of information processing apparatuses.

FIG. 13A is a functional block diagram illustrating a configuration of the information processing apparatus 100 according to the present exemplary embodiment. Similar blocks to those illustrated in FIG. 1B is designated by the same reference numerals, and description thereof is omitted.

A specification unit 1301 includes the CPU 101, and specifies a movement time period of the target position based on information output from the acquisition unit 121. The movement time period of the target position is a time period spent when the touch position is moved while keeping the touch to the touch panel 204 by the finger 210, and the touching finger 210 is then separated from the touch panel 204.

In other words, the movement time period corresponds to a movement time period of the pointer. As an example of a calculation method of the movement time period of the target position, an amount of time may be calculated from when the finger 210 touches the touch panel 204 to when the finger 210 is separated therefrom.

In this case, a time period for which the finger 210 is not moved is also calculated into the movement time period. As another example of the calculation method of the movement time period of the target position, an event on the touch panel 204 may be monitored at a constant interval (e.g., 20 msec), and the calculation may be performed to exclude the time period with no occurrence of an event notifying that the finger 210 is moved.

FIGS. 14A and 14B are flowcharts of processing flows for determining the user operation. Similar processing in FIGS. 4A and 4B is designated by the same reference numeral, and description thereof is thus omitted.

Referring to FIG. 14A, in step S1401, the specification unit 1301 specifies the movement time period during which the position where the touch of the finger 210 is detected is being moved.

In step S1402, the setting unit 123 determines whether the movement time period is longer than a predetermined threshold (e.g., 200 msec). If the setting unit 123 determines that the movement time period is longer than the predetermined threshold (YES in step S1402), the processing in step S405 is executed. If the setting unit 123 determines that the movement time period is not longer than the predetermined threshold (NO in step S1402), the processing in step S406 is executed.

According to the present exemplary embodiment, the reference value is preset to 0.5 pixel/msec. In step S405, the reference value is changed to 2.7 pixels/msec that is larger than 0.5 pixel/msec.

Referring to FIG. 14B, in place of the processing in step S1402 in FIG. 14A, processing in step S1403 is executed. Further, in place of the processing in step S405, the processing in step S415 is executed.

Similar processing is designated by the same reference numeral, and description thereof is omitted. In step S1403, the setting unit 123 determines whether the movement time period is longer than a predetermined threshold (e.g., 200 msec).

If the setting unit 123 determines that the movement time period is longer than the predetermined threshold (YES in step S1403), the processing in step S406 is executed. If the setting unit 123 determines that the movement time period is not longer than the predetermined threshold (NO in step S1403), the processing in step S415 is executed.

According to the present exemplary embodiment, the reference value is preset to 2.7 pixels/msec. In step S415, the reference value is changed to 0.5 pixel/msec that is smaller than 2.7 pixels/msec.

FIGS. 15A and 15B illustrate states of moving the position where the touch between the finger 210 and the touch panel 204 is detected. FIGS. 15A and 15B are obtained by replacing the specification using the movement distance in FIGS. 5A and 5B with the specification using the movement time period. In FIGS. 15A and 15B, description is given by assuming that the threshold in the example in FIG. 14A is set.

Referring to FIG. 15A, the movement time period from the positions 501 to 502 is 300 msec. The amount of movement per unit time is calculated, based on the position where the touch is finally detected before the release and the position where the touch is detected before 20 msec thereof. Further, the amount of movement per unit of the amount of time is 2.5 pixels/msec.

At this time, the determination unit 124 does not output the signal indicating the flick operation to the control unit 125. That is, the determination unit 124 determines that a series of operations illustrated in FIG. 15A is not the flick operation but the drag and drop operation.

Referring to FIG. 15B, the movement time period from the positions 511 to 512 is 100 msec. The amount of movement per unit time is calculated based on the position where the touch is finally detected before the release and the position where the touch is detected before 20 msec thereof. Further, the calculated amount of movement per unit time is 0.7 pixel/msec.

At this time, the determination unit 124 outputs the signal indicating the flick operation to the control unit 125. That is, the determination unit 124 determines that a series of operations in FIG. 15B is the flick operation.

Figure 16A:
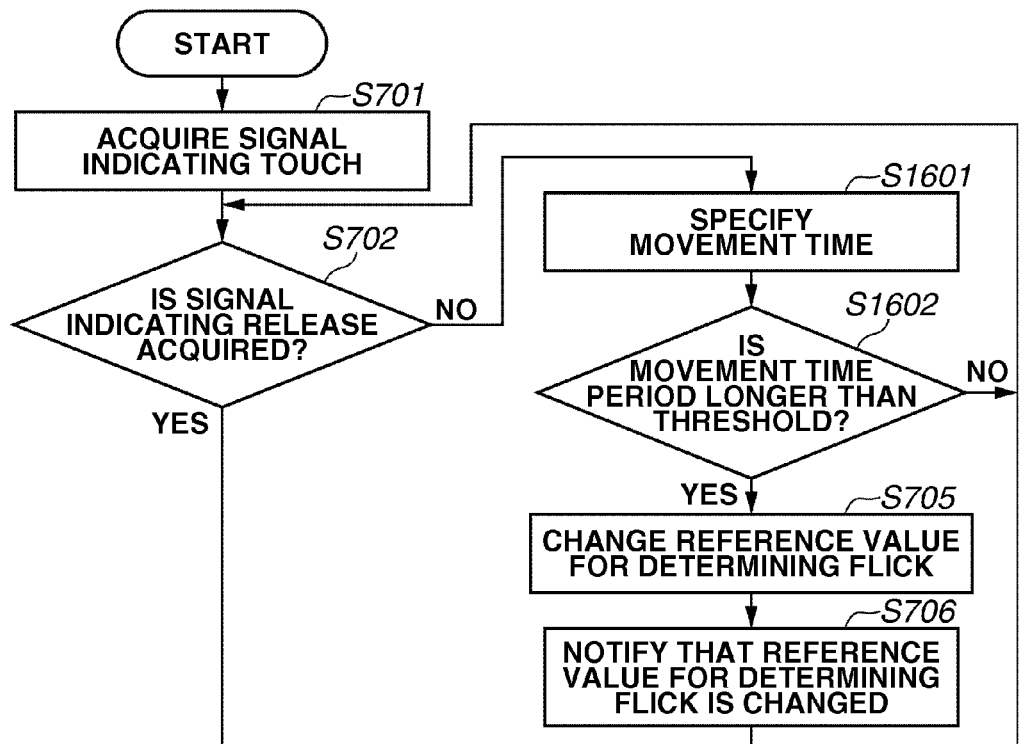
FIGS. 16A and 16B are flowcharts illustrating examples of the processing for determining the user operation.
Figure 16B:
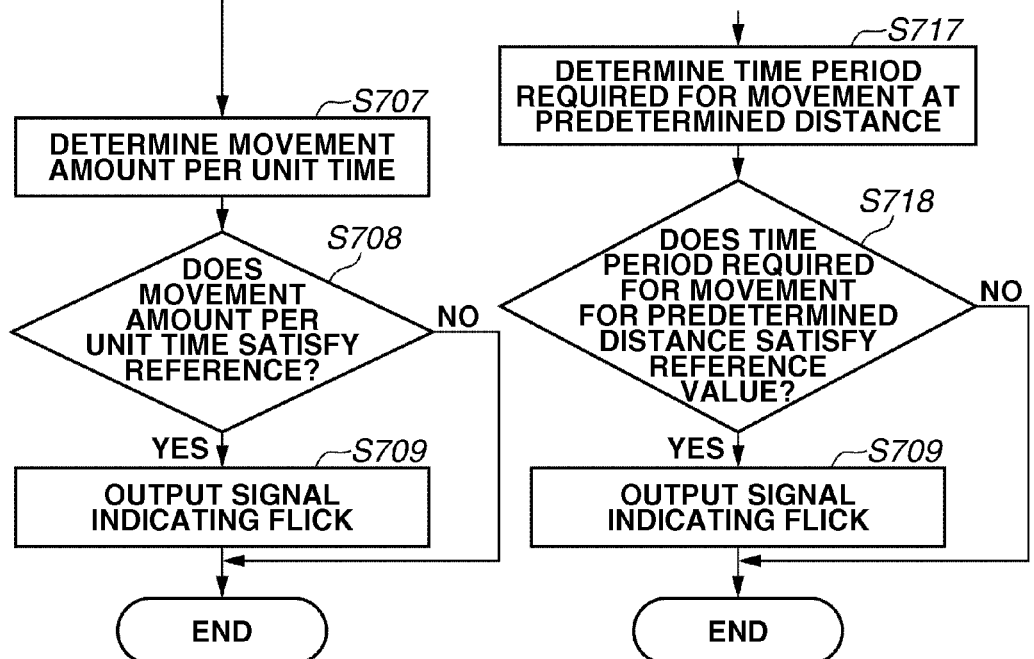

FIGS. 16A and 16B are flowcharts illustrating processing flows for determining the user operation. Similar processing to that in FIGS. 7A and 7B is designated by the same reference numeral, and description thereof is omitted.

Referring to FIG. 16A, in step S1601, the specification unit 1301 specifies the movement time period required to move the position where the touch is detected. In step S1602, the setting unit 123 determines whether the movement time period is longer than a predetermined threshold (e.g., 200 msec).

If the setting unit 123 determines that the movement time period is longer than the predetermined threshold (YES in step S1602), the processing in step S705 is executed. If the setting unit 123 determines that the movement time period is not longer than the predetermined threshold (NO in step S1602), the processing in step S702 is executed.

In other words, in the present flowchart, the movement time period is measured every time when an event indicating that the finger 210 is moved is notified from the touch panel 204, and it is determined whether the reference value for determining the flick operation is changed. The processing flow in FIG. 16B is similar to that in FIG. 7B and description thereof is omitted.

FIG. 17 is a flowchart illustrating a processing flow for determining the user operation. Similar processing to that in FIG. 8 is designated by the same reference numeral, and description thereof is omitted.

Processing in step S1401 is similar to that in step S1401 in FIG. 14, and description thereof is thus omitted. In step S1701, the setting unit 123 determines whether an amount (T) of movement time period specified in step S1401 is any one of (1) shorter than a first threshold Th1, (2) the first threshold Th1 or longer and shorter than a second threshold Th2, and (3) the second threshold Th2 or longer (Th1<Th2).

The first threshold Th1 is, e.g., 200 msec, and the second threshold Th2 is, e.g., 300 msec. If (1), that is, the movement time period is shorter than the first threshold Th1, the processing in step S805 is executed. If (2), that is, the movement time period is the first threshold Th1 or longer and is shorter than the second threshold Th2, processing in step S806 is executed. If (3), that is, the movement time period is the second threshold Th2 or longer, processing in step S807 is executed.

According to the present exemplary embodiment, the reference value for determining the flick operation is changed depending on the length of the movement time period of the target position.

While the target position is not moved, the movement time period can be also counted. Therefore, it is possible to count a time period for a press-and-hold operation that, e.g., the finger 210 touches the touch panel 204, the touch continues for a predetermined time period, and the finger 210 is then separated from the touch panel 204.

Therefore, when performing the press-and-hold operation because the user cannot decide to perform the touch operation, even if the finger 210 is then separated from the touch panel 204 after the finger 210 is slightly moved, the movement is not determined as the flick operation.

Figure 13B:
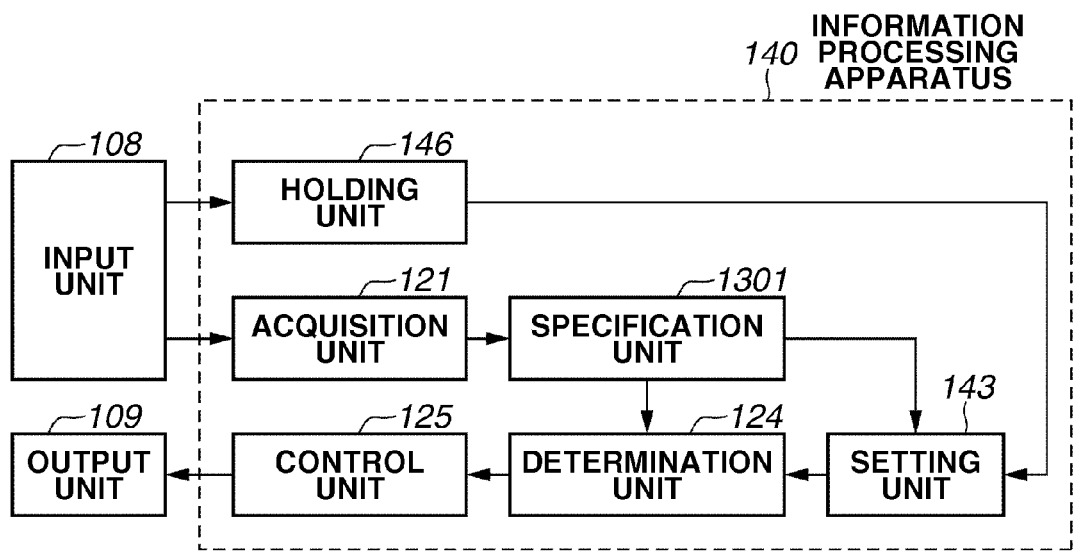

FIG. 13B is a functional block diagram illustrating a configuration of the information processing apparatus 140 according to a seventh exemplary embodiment. Referring to FIG. 13B, the holding unit 146 is further provided to the configuration illustrated in FIG. 13A to hold information indicating the size of the operation region.

The setting unit 143 sets a reference value for determining the threshold of the movement time period or the flick operation based on the information indicating the size of the operation region. The functional blocks have been already described, and a specific description thereof is thus omitted.

Figure 18:
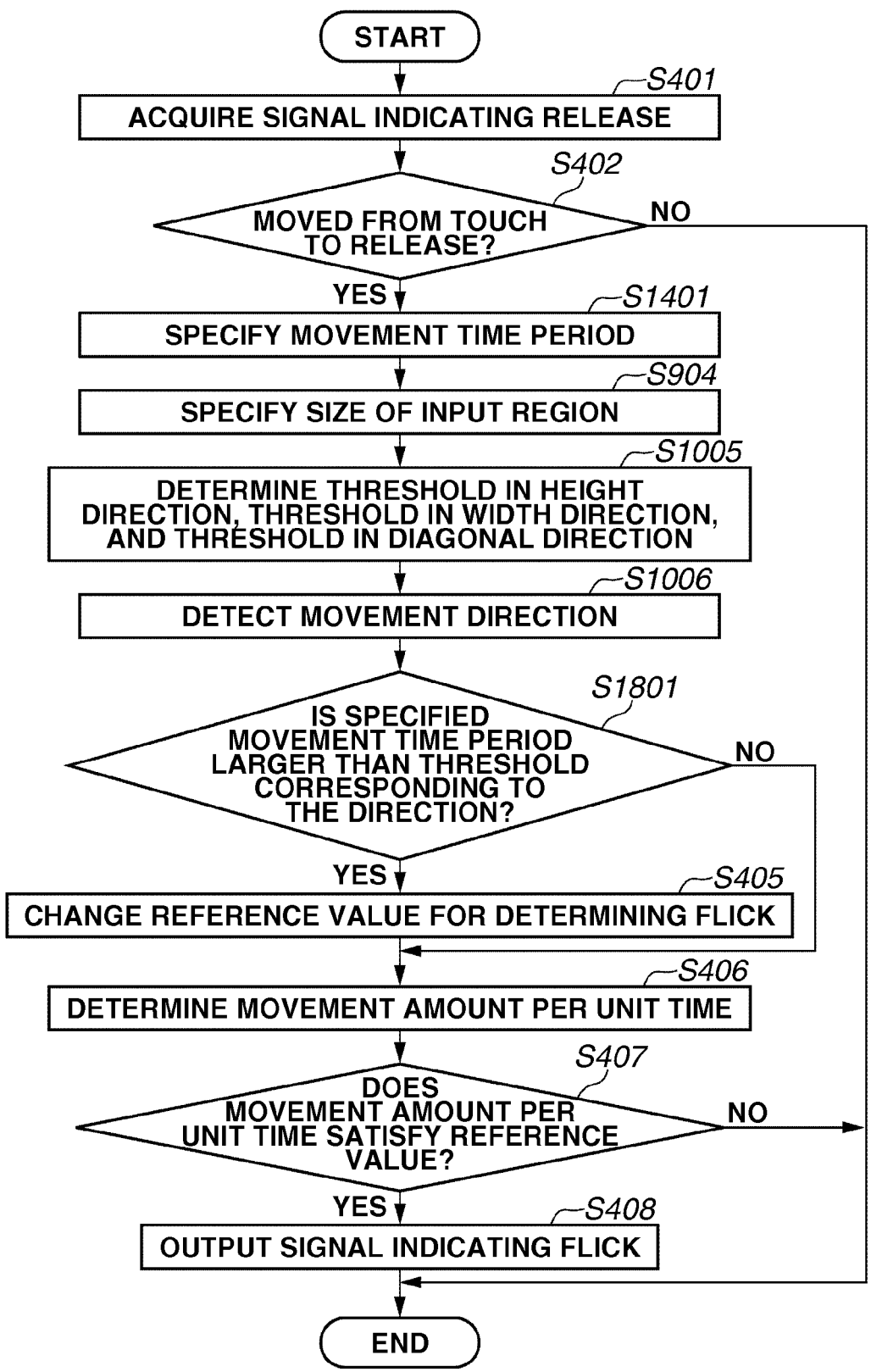
FIG. 18 is a flowchart illustrating an example of processing for determining the user operation.

FIG. 18 is a flowchart illustrating a processing flow for determining the user operation. Similar processing to that in FIG. 10 is designated by the same reference numeral, and description thereof is omitted.

In step S1801, the setting unit 143 determines whether the movement time period specified in step S1401 is longer than the threshold corresponding to the movement direction detected in step S1006.

If the setting unit 143 determines that the movement time period specified in step S1401 is longer than the threshold (YES in step S1801), the processing in step S405 is executed. If the setting unit 143 determines that the movement time period specified in step S1401 is not longer than the threshold (NO in step S1801), the processing in step S406 is executed.

In step S405, the setting unit 143 may also set individual values in the height, width, and diagonal directions to the reference values for determining the flick operation based on the size of the operation region specified in step S904.

According to the present exemplary embodiment, the movements in the height, width, and diagonal directions are determined. Further, the determination processing of the movement time period is performed for each direction. Thus, it is effective when the processing is consequently changed depending on the movement direction of the target position.

The present invention is realized by executing the following processing. That is, software (program) that realizes the functions according to the exemplary embodiments is supplied to a system or an apparatus via a network or various storage media. Further, a computer (or central processing unit (CPU) or micro processing unit (MPU)) in the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-261607 filed Nov. 24, 2010 and No. 2011-164009 filed Jul. 27, 2011, which is hereby incorporated by reference herein in their entirety.

What is claimed is:

1. An information processing apparatus configured to determine a flick operation of a pointer, the information processing apparatus comprising a processor coupled to a memory, the processor being programmed to:
　display an image on a predetermined screen;
　acquire position information of each of one or more touched positions periodically detected on a touch panel;
　acquire an amount of movement of the pointer during input of one stroke, based on the position information of a plurality of touched positions periodically detected from when the pointer touched the touch panel to before the pointer is released from the touch panel;
　acquire a movement speed as a speed of the pointer when the pointer is released from the touch panel, based on the position information of a plurality of touched positions periodically detected before the pointer is released from the touch panel;
　select a speed threshold from a plurality of speed thresholds based on the amount of movement of the pointer during the input of one stroke;

determine that the flick operation of the pointer has occurred at the end of the movement in a case where the movement speed exceeds the speed threshold selected by the processor; and move the image displayed on the predetermined screen, in a case where it is determined that the flick operation has occurred based on the movement speed and the speed threshold selected by the processor, in a direction of the flick operation after the pointer is released from the touch panel.

2. The information processing apparatus according to claim 1, wherein, when the amount of movement of the pointer is not larger than a distance threshold, the processor selects a first speed threshold and, when the amount of movement is larger than the distance threshold, selects a second speed threshold larger than the first speed threshold.

3. The information processing apparatus according to claim 2, wherein the processor is further programmed to decide the distance threshold based on a size of an operation region in which operation with the pointer is allowed.

4. The information processing apparatus according to claim 1, wherein the processor is further programmed to control a display device based on a determination result of the processor, and in a case where the processor determines the flick operation of the pointer has occurred, the display device to display an image being slid while the pointer is separated from the panel and control, in a case where the processor determines the flick operation of the pointer has not occurred, the display device to display the image being stationary while the pointer is separated from the panel.

5. The information processing apparatus according to claim 1, wherein the movement speed of the pointer is an amount of movement per unit of time and is acquired from a position where a contact state is finally detected before a release and a position where the contact state is detected at an earlier time before the time when the contact state is finally detected before the release.

6. An operation method of an information processing apparatus that determines a flick operation of a pointer, the operation method comprising:

displaying an image on a predetermined screen;

acquiring position information of each of one or more touched positions periodically detected on a touch panel;

acquiring an amount of movement of the pointer during input of one stroke, based on the position information of a plurality of touched positions periodically detected from when the pointer touched the touch panel to before the pointer is released from the touch panel;

acquiring a movement speed as a speed before the pointer is released, based on the position information of a plurality of touched positions periodically detected before the pointer is released from the touch panel;

selecting a speed threshold from a plurality of speed thresholds based on the amount of movement of the pointer during the input of one stroke;

determining that the flick operation of the pointer has occurred at the end of the movement in a case where the movement speed exceeds the speed threshold in the selecting; and moving the image displayed on the predetermined screen, in a case where it is determined that the flick operation has occurred based on the movement speed and the speed threshold in the selecting, in a direction of the flick operation after the pointer is released from the touch panel.

7. An information processing apparatus configured to determine a flick operation of a pointer, the information processing apparatus comprising a processor coupled to a memory, the processor being programmed to:

display an image on a predetermined screen;

acquire position information of each of one or more touched positions periodically detected on a touch panel;

acquire a movement time period of the pointer during input of one stroke, based on touched positions and time periodically detected from when the pointer touches a touch panel to before the pointer is released from the touch panel;

acquire a movement speed as a speed of the pointer when the pointer is released from the touch panel, based on the position information of a plurality of touched positions periodically detected before the pointer is released from the touch panel;

select a speed threshold from a plurality of speed thresholds based on the movement time period of the pointer during the input of one stroke;

determine that the flick operation of the pointer has occurred at the end of the movement in a case where the movement speed exceeds the speed threshold set by the processor; and move the image displayed on the predetermined screen, in a case where it is determined that the flick operation has occurred based on the movement speed and the speed threshold set by the processor, in a direction of the flick operation after the pointer is released from the touch panel.

8. The information processing apparatus according to claim 7, wherein, when the movement time period does not exceed a predetermined threshold, the processor sets a first speed threshold and, when the movement time period exceeds the predetermined threshold, sets a second speed threshold larger than the first speed threshold.

9. The information processing apparatus according to claim 8, wherein the processor is further programmed to decide the predetermined threshold based on a size of an operation region in which an operation with the pointer is allowed.

10. An operation method of an information processing apparatus that determines a flick operation of a pointer, the operation method comprising:

displaying an image on a predetermined screen;

acquiring position information of each of one or more touched positions periodically detected on a touch panel;

acquiring a movement time period of the pointer during input of one stroke, based on touched positions and time periodically detected from when the pointer touches a touch panel to before the pointer is released from the touch panel;

acquiring a movement speed as a speed of the pointer when the pointer is released from the touch panel, based on the position information of a plurality of touched positions periodically detected before the pointer is released from the touch panel;

selecting a speed threshold from a plurality of speed thresholds based on the movement time period of the pointer during the input of one stroke;

determining that the flick operation of the pointer has occurred at the end of the movement in a case where the movement speed exceeds the speed threshold selected in the selecting; and moving the image displayed on the predetermined screen, in a case where it is determined that the flick operation has occurred based on the movement speed and the speed threshold selected in the selecting.

11. A non-transitory computer-readable storage medium that stores a program causing a computer to execute an operation method of an information processing apparatus that determines a flick operation of a pointer, the operation method comprising:

displaying an image on a predetermined screen;

acquiring position information of each of one or more touched positions periodically detected on a touch panel;

acquiring an amount of movement of the pointer during input of one stroke, based on the position information of a plurality of touched positions periodically detected from when the pointer touched the touch panel to before the pointer is released from the touch panel;

acquiring a movement speed as a speed before the pointer is released, based on the position information of a plurality of touched positions periodically detected before the pointer is released from the touch panel;

selecting a speed threshold from a plurality of speed thresholds based on the amount of movement of the pointer during the input of one stroke;

determining that the flick operation of the pointer has occurred at the end of the movement in a case where the movement speed exceeds the speed threshold in the selecting; and moving the image displayed on the predetermined screen, in a case where it is determined that the flick operation has occurred based on the movement speed and the speed threshold in the selecting, in a direction of the flick operation after the pointer is released from the touch panel.

12. A non-transitory computer-readable storage medium that stores a program causing a computer to execute an operation method of an information processing apparatus that determines a flick operation of a pointer, the operation method comprising:

displaying an image on a predetermined screen;

acquiring position information of each of one or more touched positions periodically detected on a touch panel;

acquiring a movement time period of the pointer during input of one stroke, based on touched positions and time periodically detected from when the pointer touches a touch panel to before the pointer is released from the touch panel;

acquiring a movement speed as a speed of the pointer when the pointer is released from the touch panel, based on the position information of a plurality of touched positions periodically detected before the pointer is released from the touch panel;

selecting a speed threshold from a plurality of speed thresholds based on the movement time period of the pointer during the input of one stroke;

determining that the flick operation of the pointer has occurred at the end of the movement in a case where the movement speed exceeds the speed threshold selected in the selecting; and moving the image displayed on the predetermined screen, in a case where it is determined that the flick operation has occurred based on the movement speed and the speed threshold selected in the selecting, in a direction of the flick operation after the pointer is released from the touch panel.

* * * * *